(12) United States Patent
Xu et al.

(10) Patent No.: US 11,051,266 B2
(45) Date of Patent: Jun. 29, 2021

(54) ELECTRONIC DEVICE AND METHOD IN WIRELESS COMMUNICATION SYSTEM

(71) Applicant: Sony Corporation, Tokyo (JP)

(72) Inventors: Pingping Xu, Nanjing (CN); Bin Sheng, Nanjing (CN); Yicheng Xu, Nanjing (CN); Penshun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 88 days.

(21) Appl. No.: 16/491,576

(22) PCT Filed: Apr. 18, 2018

(86) PCT No.: PCT/CN2018/083512
§ 371 (c)(1),
(2) Date: Sep. 6, 2019

(87) PCT Pub. No.: WO2018/205807
PCT Pub. Date: Nov. 15, 2018

(65) Prior Publication Data
US 2021/0136709 A1 May 6, 2021

(30) Foreign Application Priority Data

May 8, 2017 (CN) .......................... 201710317382.4

(51) Int. Cl.
*H04W 56/00* (2009.01)
*H04W 24/04* (2009.01)

(52) U.S. Cl.
CPC ......... *H04W 56/005* (2013.01); *H04W 24/04* (2013.01); *H04W 56/0045* (2013.01)

(58) Field of Classification Search
CPC .............. H04W 56/005; H04W 24/04; H04W 56/0045; H04W 56/00; H04W 56/0005;
(Continued)

(56) References Cited

U.S. PATENT DOCUMENTS 8,611,377 B2 12/2013 Uemura
9,166,717 B2 10/2015 Bertrand
(Continued)

FOREIGN PATENT DOCUMENTS

CN 101448313 A 6/2009
CN 102239735 A 11/2011
(Continued)

OTHER PUBLICATIONS

Jiang, Chunxing. "Design of Asynchronous Cooperative Spectrum Sensing Scheme and Wideband Dynamic Spectrum Access Algorithm for Cognitive Radio Networks." (2013). (Year: 2013).*
(Continued)

*Primary Examiner* — Sharad Rampuria
(74) *Attorney, Agent, or Firm* — Xsensus LLP

(57) ABSTRACT

An electronic device and method in a wireless communication system. The electronic device includes a processing circuit configured to: determine, according to information about one or more sets of performance parameters from user equipment, one or more reporting periods in which the user equipment reports an out-of-synchronization flag, the user equipment notified of the one or more reporting periods, the out-of-synchronization flag indicating whether a synchronization delay between the user equipment and a base station exceeds a predetermined system tolerance; and if the user equipment indicates that the synchronization delay exceeds the predetermined system tolerance by using an out-of-synchronization flag reported in one of the one or more reporting periods, adjusting a timing advance, such that the user equipment synchronizes with the base station according to the adjusted timing advance.

19 Claims, 13 Drawing Sheets

(58) Field of Classification Search
CPC ........... H04W 56/001; H04W 56/0015; H04W 56/002; H04W 56/0025; H04W 56/003; H04W 56/0035; H04W 56/004; H04W 56/0055; H04B 1/7073; H04B 1/7087; H04B 1/7156; H04B 1/7183; H04B 7/18589; H04B 7/2125; H04B 7/19; H04B 2201/7073
See application file for complete search history.

(56) References Cited

U.S. PATENT DOCUMENTS

| 2014/0064195 A1* | 3/2014 | Li | H04W 56/00 370/329 |
|---|---|---|---|
| 2014/0086219 A1 | 3/2014 | Suzuki | |

FOREIGN PATENT DOCUMENTS

| CN | 102281626 A | 12/2011 |
|---|---|---|
| CN | 102647757 A | 8/2012 |
| EP | 3148245 A | 3/2017 |
| WO | 2013/023354 A1 | 2/2013 |

OTHER PUBLICATIONS

International Search Report and Written Opinion dated Jul. 4, 2018 for PCT/CN2018/083512 filed on Apr. 18, 2018, 8 pages including English Translation of the International Search Report.
Sandrasegaran K et al: "Speed estimation using transmit power control commands for UMTS", Computer Applications and Industrial Electronics (ICCAIE), 2010 International Conference on, IEEE, Dec. 5, 201 O (Dec. 5, 2010), pp. 447-452, XP031983287, DOI: 10.1109/ICCAIE.2010.5735121 ISBN: 978-1-4244-9054-7.

* cited by examiner

ELECTRONIC DEVICE AND METHOD IN WIRELESS COMMUNICATION SYSTEM

CROSS-REFERENCE TO RELATED APPLICATIONS

This application is based on PCT filing PCT/CN2018/083512, filed Apr. 18, 2018, which claims priority to Chinese Patent Application No. 201710317382.4, titled "ELECTRONIC DEVICE AND METHOD IN WIRELESS COMMUNICATION SYSTEM", filed on May 8, 2017 with the Chinese Patent Office, the entire contents of each are incorporated herein by reference.

FIELD

The present disclosure relates to the field of wireless communications, and in particular to an electronic apparatus and method in a wireless communication system that can reduce signaling overheads for uplink synchronization.

BACKGROUND

In a mobile communication system based on a conventional waveform such as an Orthogonal Frequency Division Multiplexing (OFDM) waveform, a problem that the OFDM-based mobile communication system, for example, is sensitive to a synchronization time delay can be solved by uplink synchronization. Specifically, in a case that a user equipment is to establish a Radio Resource Control (RRC) connection with a base station, the user equipment needs to transmit a random access preamble first. The signal of the preamble is used for estimating a transmission time of the user equipment, and a timing advance (TA) is calculated based on the transmission time. Finally, the transmission time of the user equipment is determined by adjusting the TA.

For example, in the OFDM-based mobile communication system, each user equipment has a Time Alignment Timer (TAT). During a TAT period, it is considered that the user equipment is in synchronization with the base station, until the TAT period expires or a new Timing Advance Command (TAC) is received. If the user equipment successfully receives a new TAC in the current TAT, the received TAC is applied in the uplink transmission, and a new TAT is started. If no TAC is received until the TAT has already expired, it is determined that the user equipment is in asynchronization with the base station, and it is required to re-request for random access.

As described above, the uplink synchronization control process is performed via the cooperation of the TAT and the TAC. The TAT is equivalent to an effective time period of the TAC, and the TAC is used to trigger or start a new TAT. If either of the TAT or the TAC fails to work normally, the user equipment will be out of synchronization with the base station, and it is required to restart random access, which consumes more resources and during which the uplink transmission is interrupted.

For uplink synchronization of a mobile communication system based on a conventional waveform, it is required that all of the received signals arrive at the base station at a scheduled time. For example, in the OFDM-based system, in order to maintain orthogonality, the base station and the user equipment must be in exact synchronization with respect to time and frequencies, and once the user equipment is in asynchronization with the base station, the system performance will be seriously affected. In addition, in order to ensure the transmission of control information, a Hybrid Automatic Repeat Request (HARQ) mechanism is adopted in the synchronization process. When an error occurs during the transmission of the synchronization control information, re-transmission is performed automatically due to the HARQ mechanism, to increase the probability of successful transmission. However, this may result in an additional time delay, which affects the original purpose of synchronous control. In order to save overheads, the synchronization control information is generally placed at the end of a synchronization period, and therefore, the additional time delay caused by HARQ will undoubtedly increase the risk, which is one of the challenges in academia and industry.

It can be seen from the above that large overheads are caused in the entire communication system by the factors in various aspects as described, which may result in a degraded performance of the entire system due to the consumption of resources such as energy, signaling, and time delays.

SUMMARY

Brief summary of the present disclosure is given hereinafter, so as to provide basic understanding in some aspects of the present disclosure. However, it is to be understood that this summary is not an exhaustive overview of the present disclosure. It is neither intended to identify key or critical parts of the present disclosure, nor intended to define the scope of the present disclosure. It merely functions to present some concepts of the present disclosure in a simplified form to be used as a prelude to a more detailed description stated later.

In view of the problem(s) as described above, at least one object of the present disclosure is to provide an electronic apparatus and method in a wireless communication system that can reduce signaling overheads for uplink synchronization.

According to an aspect of the present disclosure, there is provided an electronic apparatus in a wireless communication system. The electronic apparatus includes processing circuitry configured to: determine, based on information regarding one or more groups of performance parameters from a user equipment, one or more reporting periods for the user equipment to report an asynchronization flag, which are to be notified to the user equipment, wherein the asynchronizaiton flag indicates whether a synchronization time delay between the user equipment and a base station exceeds a predetermined system tolerance; and adjust, if the asynchronizaiton flag reported by the user equipment at one of the one or more reporting periods indicates the synchronization time delay exceeds the predetermined system tolerance, a timing advance, so that the user equipment makes synchronization with the base station based on the adjusted timing advance.

According to another aspect of the present disclosure, there is also provided an electronic apparatus in a wireless communication system. The electronic apparatus includes processing circuitry configured to: generate information regarding one or more groups of performance parameters of a user equipment, the information being to be reported to a base station; generate, based on one or more reporting periods for reporting an asynchronization flag from the base station and one group of performance parameters currently used by the user equipment, the asynchronization flag, which is to be reported to the base station, wherein the asynchronization flag indicates whether a synchronization time delay between the user equipment and the base station exceeds a predetermined system tolerance; and make synchronization with the base station based on a timing advance, which is determined by the base station based on the asynchronizaiton flag.

According to yet another aspect of the present disclosure, there is provided a method in a wireless communication system. The method includes: determining, based on information regarding one or more groups of performance parameters from a user equipment, one or more reporting periods for the user equipment to report an asynchronization flag, which are to be notified to the user equipment, where the asynchronizaiton flag indicates whether a synchronization time delay between the user equipment and a base station exceeds a predetermined system tolerance; and adjusting, if the asynchronizaiton flag reported by the user equipment at one of the one or more reporting periods indicates the synchronization time delay exceeds the predetermined system tolerance, a timing advance, so that the user equipment makes synchronization with the base station based on the adjusted timing advance.

According to still another aspect of the present disclosure, there is also provided a method in a wireless communication system. The method includes: generating information regarding one or more groups of performance parameters of a user equipment, the information being to be reported to a base station; generating, based on one or more reporting periods for reporting an asynchronization flag from the base station and one group of performance parameters currently used by the user equipment, the asynchronization flag, which is to be reported to the base station, wherein the asynchronization flag indicates whether a synchronization time delay between the user equipment and the base station exceeds a predetermined system tolerance; and making synchronization with the base station based on a timing advance, which is determined by the base station based on the asynchronizaiton flag.

According to still another aspect of the present disclosure, there is also provided an electronic apparatus in a wireless communication system. The electronic apparatus includes processing circuitry configured to: determine, based on information regarding performance parameters from a user equipment, whether a synchronization requirement between the user equipment and a base station is higher than a predetermined standard; determine, in a case that it is determined that the synchronization requirement between the user equipment and the base station is lower than the predetermined standard, a reporting period for the user equipment to report an asynchronization flag based on the information regarding the performance parameters, the reporting period being to be notified to the user equipment, wherein the asynchronization flag indicates whether a synchronization time delay between the user equipment and the base station exceeds a predetermined system tolerance; and adjust, if the asynchronization flag reported by the user equipment at the reporting period indicates that the synchronization time delay exceeds the predetermined system tolerance, a timing advance, so that the user equipment makes synchronization with the base station based on the adjusted timing advance.

According to other aspects of the present disclosure, there are also provided computer program codes and a computer program product for implementing the above-described method based on the present disclosure, and a computer readable storage medium on which the computer program codes for implementing the above-described method according to the present disclosure are recorded.

According to the embodiments of the electronic apparatus and method in a wireless communication system of the present disclosure, the user equipment determines whether to perform calibration for the uplink synchronization and periodically reports the determination result to the base station based on the reporting period determined by the base station. The base station adjusts the TA only in a case that the determination result indicates that it is required to perform synchronization calibration. Compared with the conventional closed-loop scheme for implementing uplink synchronization, signaling overheads caused by unnecessary synchronization calibration can be greatly reduced.

Other aspects of the embodiments of the present disclosure are given in the following description, in which the detailed description is used for fully disclosing, without limiting, preferred embodiments of the disclosed disclosure.

BRIEF DESCRIPTION OF THE DRAWINGS

The present disclosure may be understood better with reference to the detail description given in conjunction with the drawings in the following. The same or similar element is indicated by the same or similar reference numeral throughout all the drawings. The drawings together with the following detailed description are incorporated into and form a part of the specification and serve to further illustrate the preferred embodiments of the present disclosure and to explain the principle and advantages of the present disclosure by way of example. In the drawings.

DETAILED DESCRIPTION OF EMBODIMENTS

Figure 1:
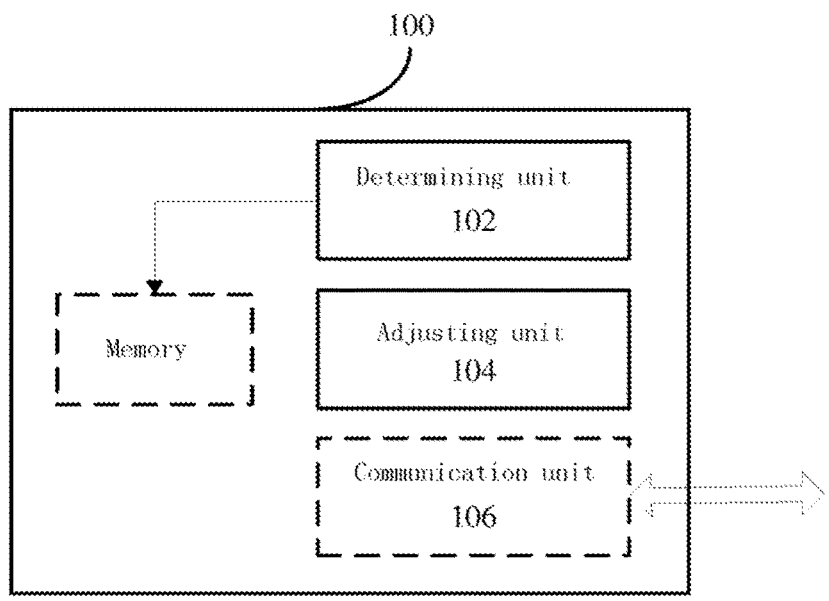
FIG. 1 is a block diagram showing an example of a functional configuration of an electronic apparatus on a base station side in a wireless communication system according to an embodiment of the present disclosure.

Exemplary embodiments of the present disclosure will be described below in conjunction with the drawings. For the sake of clarity and conciseness, not all the features of practical embodiments are described in the specification. However, it is to be understood that numerous embodiment-specific decisions shall be made during developing any of such actual embodiments so as to achieve the developer's specific goals, for example, to comply with system-related and business-related constraining conditions which will vary from one embodiment to another. Furthermore, it is also to be understood that although the development work may be very complicated and time-consuming, for those skilled in the art benefiting from the present disclosure, such development work is only a routine task.

It is further to be noted here that, to avoid obscuring the present disclosure due to unnecessary details, only the apparatus structure and/or processing step closely related to the solution of the present disclosure are shown in the drawings, and other details less related to the present disclosure are omitted.

In a system communication based on a conventional waveform (such as Orthogonal Frequency Division Multiplexing (OFDM), cyclic prefix-Orthogonal Frequency Division Multiplexing (CP-OFDM), Discrete Fourier transform-Spread-Orthogonal Frequency Division Multiplexing (DFT-S-OFDM) and the like), since the system has a high requirement for uplink synchronization due to the sensitivity to the synchronization time delay, the closed-loop uplink synchronization scheme is generally implemented by the cooperation of the TAT and TAC as described above in the conventional technology. However, with the adopt of new waveforms that are less sensitive to the synchronization time delay (such as Flexible Cyclic Prefix-Orthogonal Frequency Division Multiplexing (FCP-OFDM), Filtered Orthogonal Frequency Division Multiplexing (F-OFDM), Filter Bank Multi-carrier (FBMC), Generalized Frequency Division Multiplexing (GFDM), Universal Filtered Multi-Carrier (UFMC), and the like), since the synchronization requirement of the communication system based on the new waveform is not very high, it may be considered that a certain degree of variation in the time delay does not degrade the performance of the entire system. In this case, if the timing advance is frequently adjusted with the closed-loop uplink synchronization scheme as in the system based on the conventional waveform to maintain exact synchronization between the user equipment and the base station, a large signaling overhead may be caused unnecessarily.

In view of this, the uplink synchronization scheme according to an embodiment of the present disclosure is provided, in which only when the user equipment determines that the synchronization time delay between the base station and the user equipment exceeds the system tolerance, that is, only when the degradation of the system performance caused by the synchronization time delay exceeds the predetermined tolerance, the timing advance TA is adjusted so that the user equipment re-make uplink synchronization with the base station based on the adjusted TA, thus minimizing the signaling overhead while maintaining the system performance. Compared with the conventional closed-loop uplink synchronization scheme, in the uplink synchronization scheme of the present disclosure, the user equipment itself determines whether it is necessary to re-make uplink synchronization with the base station, and thus this scheme may also be referred to as an open-loop uplink synchronization scheme hereinafter.

Hereinafter, the embodiments of the present disclosure will be described in detail with reference to FIGS. 1 to 14. Hereinafter, the description is made in the following order.

1. Electronic apparatus on a base station side in a wireless communication system according to an embodiment of the present disclosure 2. Electronic apparatus on a user equipment side in a wireless communication system according to an embodiment of the present disclosure 3. Information interaction process for implementing open-loop uplink synchronization according to an embodiment of the present disclosure 3-1. Information interaction process for implementing initialization of uplink synchronization 3-2. Information interaction process for maintaining uplink synchronization 4. Method on a base station side in a wireless communication system according to an embodiment of the present disclosure 5. Method on a user equipment side in a wireless communication system according to an embodiment of the present disclosure 6. Technical effect and simulation of the present disclosure 7. Computing device for implementing an electronic apparatus and method according to the present disclosure 8. Application examples of the technology according to the present disclosure 8-1. Application examples of a base station 8-2. Application examples of a user equipment

[1. Electronic Apparatus on a Base Station Side in a Wireless Communication System According to an Embodiment of the Present Disclosure]

First, an example of functional configuration of an electronic apparatus on a base station side in a wireless communication system according to an embodiment of the present disclosure is described with reference to FIG. 1. FIG. 1 is a block diagram showing an example of a functional configuration of an electronic apparatus on a base station side in a wireless communication system according to an embodiment of the present disclosure.

As shown in FIG. 1, an electronic apparatus 100 according to the embodiment may include a determining unit 102 and an adjusting unit 104. The electronic apparatus 100 may be located on the base station side, or it may operate as the base station itself by including other external devices. In the following, functional configuration examples of respective units are described in detail.

The determining unit 102 may be configured to determine, based on information regarding one or more groups of performance parameters from a user equipment, one or more reporting periods for the user equipment to report an asynchronization flag, which are to be notified to the user equipment. The asynchronizaiton flag indicates whether a synchronization time delay between the user equipment and a base station exceeds a predetermined system tolerance.

Specifically, after the random access or during the random access process, the user equipment reports the information regarding the one or more groups of performance parameters to the base station, and the one or more groups of performance parameters may include only one group of performance parameters currently used by the user equipment, or all groups of performance parameters supported by the user equipment. The determining unit 102 may determine one or more reporting periods corresponding to the one or more groups of performance parameters to be notified to the user equipment, and the user equipment may report the asynchronizaiton flag based on the currently used group of performance parameters, at a reporting period corresponding to that group of performance parameters.

Preferably, each group of the one or more groups of performance parameters may include one or more of a waveform type, a cyclic prefix length, a filter length, and a subcarrier interval. The waveform type preferably may include, without being limited to, one or more of new waveforms such as FCP-OFDM, F-OFDM, FBMC, GFDM, UFMC, and conventional waveforms such as CP-OFDM, DFT-S-OFDM, and may also include any other waveform types that may be proposed in the future.

Specifically, the determining unit 102 may be further configured to determine each of the one or more reporting periods, so that the synchronization time delay generated when the user equipment moves at a maximum speed within the reporting period is within a predetermined system tolerance. In a case that this condition is met, the determining unit 102 may set the reporting period as long as possible to minimize the signaling overhead without impacting the system performance.

Since the variation in a time delay in the mobile communication is generally caused by a change of the location of the user equipment, it may be considered that when the user equipment moves within a certain small range, that is, when a relative displacement of the user equipment does not exceed a predetermined displacement threshold, the synchronization time delay is within the predetermined system tolerance. The process of determining the reporting period by the determining unit 102 will be specifically described based on this principle.

For example, assuming that the predetermined system tolerance (that is, a maximum time delay that the system may tolerate) is t_delay, a change of the distance causing the delay is t_delay*c, where c represents the speed of light, and the maximum reporting period of the asynchronization flag is thus calculated as $t\_delay*c/v_{max}$, where $v_{max}$ represents a maximum moving speed of the user equipment. That is, the determining unit 102 may determine the reporting period to have a value as large as possible within a range not exceeding the maximum reporting period $t\_delay*c/v_{max}$ according to actual needs, so as to minimize the signaling overhead.

Moreover, in order to be compatible with a system based on a conventional waveform, the determining unit 102 may be further configured to set, in a case that it is determined that the synchronization requirement between the user equipment and the base station is high (that is, higher than a predetermined standard) based on a group of performance parameters (for example, a waveform type) from the user equipment, that is, in a case that it is determined that the communication between the user equipment and the base station is performed based on a conventional waveform sensitive to the synchronization time delay (for example, in a CP-OFDM-based communication system), the reporting period corresponding to the group of performance parameters to be equal to or less than a length of a time alignment timer (TAT), thus ensuring exact synchronization between the user equipment and the base station.

Alternatively, in order to be compatible with the system based on the conventional waveform, for example, in a case that the determining unit 102 determines that the synchronization requirement between the user equipment and the base station is high based on information regarding the performance parameters, it may be switched to perform an existing closed-loop uplink synchronization scheme, instead of the uplink synchronization scheme according to the present disclosure, so as to ensure exact synchronization between the user equipment and the base station.

The adjusting unit 104 may be configured to adjust, in a case that the asynchronization flag reported by the user equipment at one of the one or more reporting periods determined by the determining unit 102 indicates that the synchronization time delay between the user equipment and the base station exceeds the predetermined system tolerance, the timing advance (TA) so that the user equipment makes synchronization with the base station based on the adjusted timing advance. Here, the "asynchronization flag" may also be regarded as a flag indicating whether it is required to adjust the TA, and may be referred to as "TA flag" hereinafter. For example, if the TA flag is 0, it is indicated that the synchronization time delay does not exceed the system tolerance and it is not required to adjust the TA, and if the TA flag is 1, it is indicated that the synchronization time delay exceeds the system tolerance and it is required to adjust the TA, so that the user equipment re-makes synchronization with the base station based on the adjusted TA.

Specifically, the adjusting unit 104 may be further configured to calculate a current synchronization time delay of the user equipment and adjust the TA based on the calculated current synchronization time delay, in a case that the asynchronization flag indicates that the synchronization time delay exceeds the predetermined system tolerance. The adjusted new TA is transmitted to the user equipment, so that the user equipment re-makes synchronization with the base station based on the new TA. On the other hand, if the asynchronization flag indicates that the synchronization time delay is still within the system tolerance, the adjusting unit 104 does not perform the adjustment operation, and thus no new TA is transmitted to the user equipment. Therefore, if the user equipment does not receive any new TA until the TAT expires, the user equipment may maintain the current synchronization state and continues data transmission without re-making uplink synchronization. The process of calculating the current synchronization time delay of the user equipment and adjusting the TA is the same as that in the conventional technology, and details thereof are not described herein.

Preferably, in order to further reduce the signaling overhead, a table representing all available groups of performance parameters in the communication system may be pre-stored on the base station side and the user equipment side, so that the user equipment may report, in a case that the user equipment reports the group of performance parameters currently used by the user equipment or all the groups of performance parameters supported by the user equipment to the base station, indexes indicating the groups of performance parameters by referring to the stored table. In this way, the determining unit 102 in the electronic apparatus on the base station side may refer to the table stored in a memory (which is optional and is shown by a dashed line in FIG. 1) after receiving one or more indexes from the user equipment, to determine groups of performance parameters corresponding to the one or more indexes, so as to determine reporting periods corresponding to the groups of performance parameters. For example, information of the table may be alternatively stored in advance on the base station side, and the information of the table is notified by the base station to all user equipments served by it, for example, by broadcast or multicast, at system initialization.

It is to be noted that, as described above, in a case that the information regarding performance parameters reported by the user equipment includes all groups of performance parameters supported by the user equipment, the base station needs to determine the reporting periods of all the groups of performance parameters and notify the user equipment of the same at one time. Hence, when the base station notifies the user equipment of the reporting periods, in order to make the user equipment understand the correspondence between the reporting periods and the groups of performance parameters, the base station needs to notify the user equipment of the groups of performance parameters and the corresponding reporting periods that are associated with each other. In an exemplary embodiment, the base station may notify the user equipment of the reporting periods and indexes of the corresponding groups of performance parameters that are associated with each other. Those skilled in the art may also think of other ways to notify the user equipment, as long as the user equipment can understand the correspondence between the reporting periods and the groups of performance parameters.

In addition, it is to be understood that the number of user equipments is not limited herein. Tat is, there may be one or more user equipments making uplink synchronization with the base station, so that the base station may perform the above synchronization process for each of the user equipments. Alternatively, for some user equipments that cannot operate in a system based on a new waveform, the user equipments may not transmit the information regarding performance parameters to the base station, so that uplink synchronization between these user equipments and the base station is performed based on the conventional closed-loop synchronization scheme. That is, the base station may simultaneously make uplink synchronization with multiple user equipments with the synchronization scheme of the present disclosure or the conventional synchronization scheme.

It is to be noted that the electronic apparatus 100 herein may be implemented at a chip level, or may be implemented at an apparatus level by including other external components. For example, the electronic apparatus 100 may operate as a complete machine to function as a serving base station, and include a communication unit 106 (which is optional and is denoted by a dashed block) for performing data transmission and reception operations with an external device. For example, the communication unit 106 may be configured to perform communication with the user equipment, which includes: receiving information regarding performance parameters from the user equipment, notifying the user equipment of the reporting periods, receiving the asynchronization flag from the user equipment, notifying the user equipment of the adjusted TA, and the like. It is to be noted that the specific implementation of the communication unit 106 is not limited here, and it may include one or more communication interface(s) for supporting communication with different external devices.

In addition, it is further to be noted that the various functional units described above are merely logical modules divided according to the specific functions thereof, and are not intended to limit the specific implementations. In actual implementations, the above functional units may be implemented as separate physical entities, or may be implemented by a single entity (for example, a processor (a CPU, a DSP or the like), an integrated circuit, or the like).

Corresponding to the electronic apparatus on the base station side as described above, an example of a functional configuration of an electronic apparatus on a user equipment side is described below.

[2. Electronic Apparatus on a User Equipment Side in a Wireless Communication System According to an Embodiment of the Present Disclosure]

Figure 2:
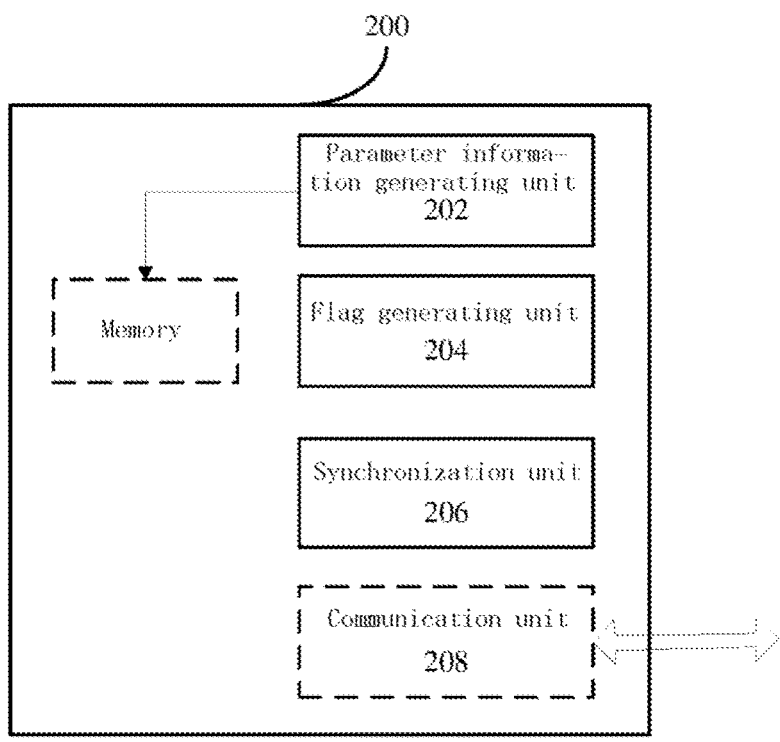
FIG. 2 is a block diagram showing an example of a functional configuration of an electronic apparatus on a user equipment side in a wireless communication system according to an embodiment of the present disclosure.

FIG. 2 is a block diagram showing an example of a functional configuration of an electronic apparatus on a user equipment side in a wireless communication system according to an embodiment of the present disclosure.

As shown in FIG. 2, an electronic apparatus 200 according to the embodiment may include a parameter information generating unit 202, a flag generating unit 204, and a synchronization unit 206. Here, the electronic apparatus 200 may be located on the user equipment side, or it may operate as the user equipment itself by including other external devices. Functional configuration examples of respective units are described in detail hereinafter.

The parameter information generating unit 202 may be configured to generate information regarding one or more groups of performance parameters of a user equipment, the information being to be reported to a base station.

The one or more groups of performance parameters may include only one group of performance parameters currently used by the user equipment or all groups of performance parameters supported by the user equipment.

Specifically, in a case that the information reported to the base station includes only information regarding the one group of performance parameters currently used by the user equipment, if the user equipment supports switching between different waveform systems, the parameter information generating unit 202 may be further configured to generate, when the user equipment switches to a new waveform system, information regarding one group of performance parameters that are used by the user equipment for operating in the switched waveform system, the information being to be notified to the base station. In this way, the information regarding performance parameters is reported to the base station only when the waveform system is switched, and thus compared with the scheme in which the information regarding all groups of performance parameters supported by the user equipment is reported to the base station at one time when the initialization is performed, the unnecessary signaling overhead is reduced (especially if the user equipment rarely performs switch among waveform systems).

On the other hand, the user equipment may report the information regarding all groups of performance parameters supported by the user equipment to the base station when the initialization is performed, so that the base station may determine reporting periods of the asynchronization flag for the respective groups of performance parameters and notify the user equipment of the same at one time. In this way, once the user equipment switches from the current waveform system to another waveform system, the user equipment may report the asynchronization flag to the base station immediately at a reporting period corresponding to the performance parameters of the switched waveform system. Compared with the scheme of reporting the information regarding performance parameters to the base station only when the switch is performed and waiting for the base station to determine a reporting period, the scheme described above has a feature of high real-time performance, which especially has advantages in a case that the user equipment frequently switches among waveform systems.

Preferably, as described above, in order to reduce signaling overheads, the electronic apparatus 200 on the user equipment side may further include a memory (which is optional and is shown by a dashed box in FIG. 2) in which a table representing all available groups of performance parameters in the wireless communication system is stored, so that the parameter information generating unit 202 may generate, by referring to the table, one or more indexes indicating the one group of performance parameters currently used by the user equipment or all groups of performance parameters supported by the user equipment. For example, the information of the table may be alternatively stored in advance on the base station side, and the information of the table is notified by the base station to the user equipment, for example, by broadcast or multicast, at system initialization, and the user equipment may store the received information of the table in its memory. The one or more indexes are transmitted to the base station as information regarding performance parameters, so that the base station may determine a group of performance parameters corresponding to each of the received one or more indexes based on the one or more indexes by referring to the table stored on the base station side, and thus determine the corresponding reporting period.

The flag generating unit 204 may be configured to generate an asynchronization flag based on one or more reporting periods for the user equipment to report the asynchronization flag from the base station and the one group of performance parameters currently used by the user equipment. The asynchronization flag is to be reported to the base station, and is used to indicate whether the synchronization time delay between the user equipment and the base station exceeds a predetermined system tolerance.

Specifically, the flag generating unit 204 may determine, based on the group of performance parameters currently used by the user equipment, a reporting period corresponding to the group of performance parameters from the one or more reporting periods notified by the base station, and determine, when the reporting period expires, whether the synchronization time delay at this time exceeds the system tolerance. If the synchronization time delay at this time exceeds the system tolerance, an asynchronization flag such as "1" is generated, to indicate that the user equipment needs to re-make synchronization with the base station, and if the synchronization time delay at this time does not exceed the system tolerance, an asynchronization flag such as "0" is generated, to indicate that the current synchronization time delay is still within the tolerance range and it is unnecessary to re-make synchronization with the base station.

It is to be understood that, in a case that the user equipment only reports the group of performance parameters currently used by the user equipment to the base station, the flag generating unit 204 may directly generate an asynchronization flag based on the reporting period corresponding to the group of performance parameters notified by the base station, without performing the above-described process of determining the reporting period corresponding to the currently used group of performance parameters from the multiple reporting periods.

In addition, it is to be noted that, as described above, in a case that the user equipment reports information regarding all groups of performance parameters supported by the user equipment to the base station, the base station may notify the user equipment of the reporting periods and the corresponding groups of performance parameters that are associated with each other, so that the user equipment determines the current reporting period based on the currently used group of performance parameters and association information.

It is to be understood that since the synchronization time delay in mobile communication is generally caused by a change of the location of the user equipment, in an exemplary implementation, the flag generating unit 204 may be configured to generate the asynchronization flag based on a relative displacement of the user equipment within the reporting period corresponding to the group of performance parameters currently used by the user equipment. Specifically, if the relative displacement is greater than or equal to a predetermined displacement threshold, an asynchronization flag indicating that the synchronization time delay between the user equipment and the base station exceeds a predetermined system tolerance is generated, for example, an asynchronization flag "1" is generated, and if the relative displacement is less than the predetermined displacement threshold, an asynchronization flag, for example, "0" is generated.

The predetermined displacement threshold may be determined based on the predetermined system tolerance. Specifically, assuming that the predetermined system tolerance (that is, a maximum synchronization time delay that the system may tolerate) is $t\_delay$, a maximum value of the predetermined displacement threshold may be determined as a change of the distance $t\_delay*c$ at which the time delay is generated, where c represents the speed of light. Within a range of the maximum value, a large displacement threshold may lead to a small signaling overhead for uplink synchronization. However, in actual design, it is required to comprehensively consider other factors such as the system performance and set these parameters reasonably according to actual needs.

The predetermined displacement threshold may be determined on the user equipment side or on the base station side, which is not limited in this disclosure. However, since the process of determining whether the current relative displacement of the user equipment exceeds the predetermined displacement threshold to generate a corresponding asynchronization flag is performed by the flag generating unit 204 on the user equipment side, if the predetermined displacement threshold is determined on the base station side and notified to the user equipment, an additional signaling overhead may be caused. Therefore, the determination process is preferably performed on the user equipment side.

Preferably, the flag generating unit 204 may be further configured to estimate the relative displacement of the user equipment within the reporting period corresponding to the one group of performance parameters currently used by the user equipment by monitoring a variation in power control signaling and/or a variation in path loss within the reporting period.

The power control and the path loss are mainly affected by the relative distance between the user equipment and the base station, and the user equipment needs to always monitor the power control signaling during communication to perform data transmission with an appropriate transmission power. Therefore, the relative displacement of the user equipment may be estimated by monitoring a change of the LTE uplink closed-loop power control signaling and/or a change of the path loss, and the asynchronization flag may be generated based on the estimated relative displacement and the predetermined displacement threshold. In this way, it is determined whether the user equipment currently needs to re-make synchronization without additionally increasing the processing load of the user equipment.

The closed-loop power control refers to that the base station (for example, an eNB) adjusts a transmission power of the user equipment by a transmission power control (TPC) command in a physical downlink control channel (PDCCH). Therefore, the user equipment may estimate the relative displacement of the user equipment by monitoring a change of the TPC signaling, and determine whether it is required to re-make synchronization with the base station.

For example, the flag generating unit 204 may be configured to generate an asynchronization flag which indicates the synchronization time delay between the user equipment and the base station exceeds the predetermined system tolerance, in a case that it is monitored that the variation in the power control signaling and/or the variation in the path loss indicates that a number of times that a transmission power of the user equipment is relatively increased or decreased within the reporting period corresponding to the one group of performance parameters currently used by the user equipment is larger than or equal to a predetermined number threshold.

Specifically, a variable representing the variation in the power control signaling may be defined as PC flag, and it may be initialized to zero. When the relative distance between the user equipment and the base station changes, the power control system operates to adjust the transmission power of the user equipment. In this case, a value of the PC flag may be adjusted by monitoring the change of the power control signaling. For example, when the user equipment gets away from the base station, the transmission power indicated by the power control signaling may be increased, and the PC flag may be then incremented by one; and when the user equipment approaches the base station, the transmission power indicated by the power control signaling may be decreased, and the PC flag may be then decremented by one. If the relative distance between the user equipment and the base station remains unchanged, the power control does not change, and thus the PC flag is maintained at the previous value. During the entire communication process, the value of the PC flag changes with the change of the power control signaling, thereby reflecting the relative displacement of the user equipment.

Figure 3:
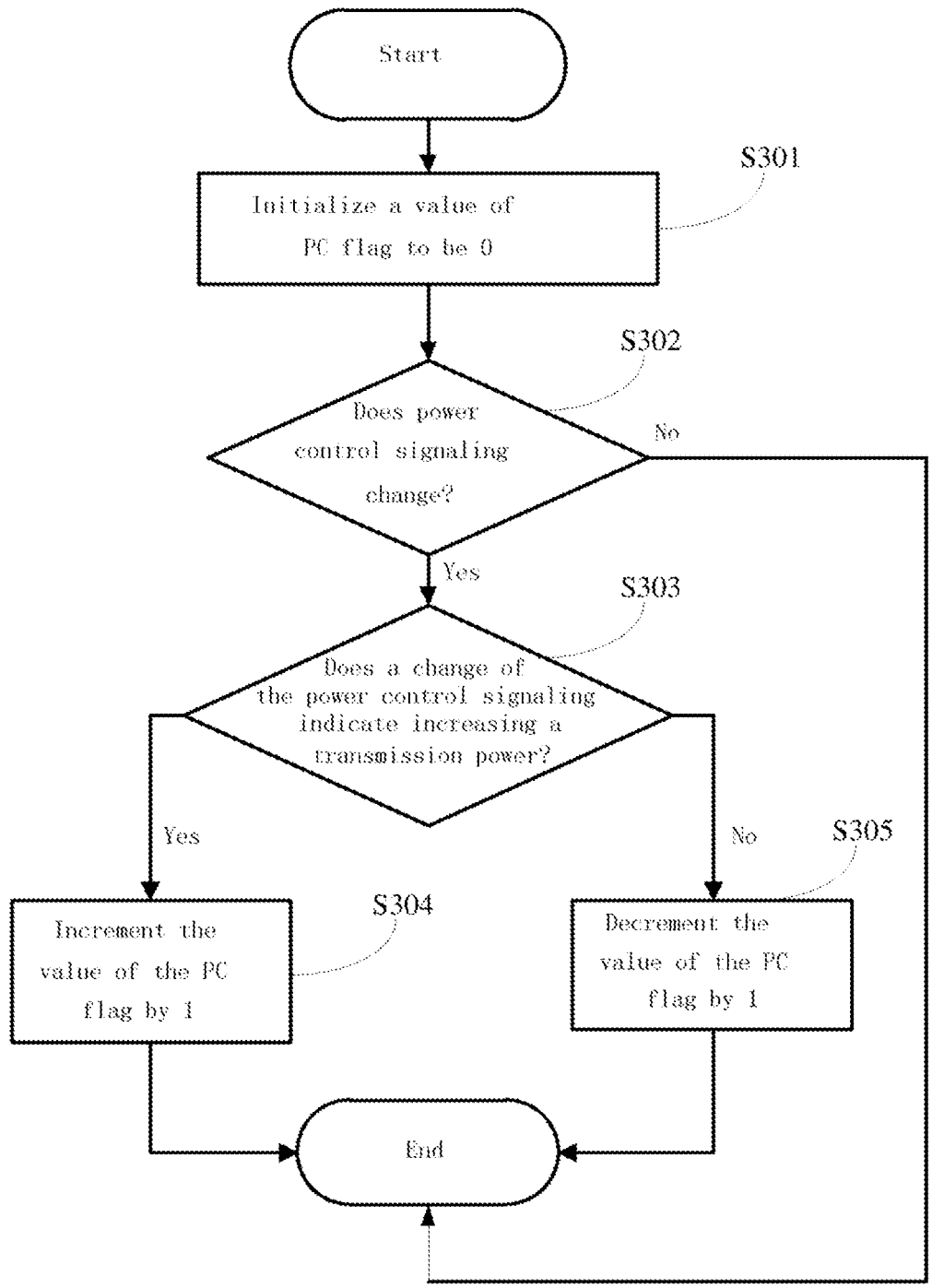
FIG. 3 is a flowchart showing a processing process for monitoring power control signaling according to an embodiment of the present disclosure.

The process of monitoring the power control signaling to adjust the PC flag is described in detail with reference to the flowchart shown in FIG. 3. FIG. 3 is a flowchart showing a processing process for monitoring power control signaling according to an embodiment of the present disclosure.

As shown in FIG. 3, firstly, in step S301, the user equipment initializes a value of the variable PC flag to zero. Then, in step S302, the user equipment monitors whether the current power control signaling changes. If the current power control signaling changes, it is indicated that the relative distance between the user equipment and the base station changes, and a synchronization time delay may occur, and it is thus required to adjust the PC flag. Next, in step S303, the user equipment further determines whether the change in the power control signaling indicates increasing the transmission power or decreasing the transmission power. If it is determined that the change in the power control signaling indicates increasing the transmission power, the value of the PC flag is incremented by one in step S304. If it is determined that the change in the power control signaling indicates decreasing the transmission power, the value of the PC flag is decremented by one in step S305. In addition, if no change in the power control signaling is monitored in step S302, it is indicated that the relative distance between the user equipment and the base station does not change or the change is very small, and thus it is unnecessary to adjust the PC flag. In this way, by repeatedly performing processes in the above steps S302 to S305 in one reporting period of the asynchronization flag, the relative displacement of the user equipment may be estimated by monitoring the change in the power control signaling.

Referring back to FIG. 2, in this case, when generating the asynchronization flag, the flag generating unit 204 may first check the value of the PC flag. If the absolute value of the PC flag is less than a predetermined number threshold, that is, if a number of times that the transmission power of the user equipment is relatively increased or decreased is less than the predetermined number threshold, it is indicated that the synchronization time delay caused by the relative displacement of the user equipment is still within the system tolerance, and it is unnecessary to re-make uplink synchronization with the base station. Therefore, an asynchronization flag of "0" is generated to indicate that it is unnecessary to adjust Ta. On the other hand, if the absolute value of the PC flag is determined to be larger than or equal to the predetermined number threshold, that is, if the number of times that the transmission power of the user equipment is relatively increased or decreased is larger than or equal to the predetermined number threshold, it is indicated that the synchronization time delay caused by the relative displacement of the user equipment exceeds the system tolerance, and it is required to re-make uplink synchronization with the base station. Therefore, an asynchronization flag of "1" is generated to indicate that it is required to adjust TA, and at the same time, the value of the PC flag is cleared.

It is to be noted that the value of the PC flag is cleared only in a case that the asynchronization flag is "1", and the current value of the PC flag should be maintained in a case that the asynchronization flag is "0". This is because, in the case that the asynchronization flag is "1", the user equipment re-makes uplink synchronization with the base station, and it may be considered that the synchronization time delay between the user equipment and the base station after resynchronization is 0, and accordingly, the change of the relative distance between the user equipment and the base station is also zero. Therefore, the value of the PC flag should be cleared. In contrast, in the case that the asynchronization flag is "0", the user equipment maintains the current synchronization state with the base station. In this case, there may be a certain synchronization time delay between the user equipment and the base station, but the synchronization time delay does not exceed the system tolerance within the reporting period, and thus it is unnecessary to re-make uplink synchronization. Therefore, in the next reporting period, the synchronization time delay (that is, the change of the relative distance) between the user equipment and the base station should be determined based on the synchronization time delay that already exists in the previous reporting period, and thus the current value of the PC flag should be maintained.

The predetermined number threshold $\alpha$ may be determined based on a predetermined power control step and the predetermined system tolerance. Specifically, for example, assuming that when the relative distance between the user equipment and the base station changes by x (that is, the relative displacement of the user equipment is x), it is required to adjust (increase or decrease) the transmission power once, where a value of x is related to the predetermined power control step. When the transmission power is continuously increased or decreased for the number of times a, the relative displacement of the user equipment is $\alpha*x$, and the synchronization time delay generated in this case is $(\alpha*x)/c$, where c represents the speed of light. Assuming that the predetermined system tolerance (that is, a maximum synchronization time delay that the system may tolerate) is t_delay, then a condition $(\alpha*x)/c \leq t\_delay$ should be satisfied, such that the threshold is calculated as $\alpha \leq (t\_delay*c)/x$, where $\alpha$ is an integer obtained by rounding down. Under the condition that the maximum limit is satisfied, a large predetermined number threshold $\alpha$ leads to a small signaling overhead for uplink synchronization.

It is to be understood that the predetermined number threshold a may be determined on the user equipment side or on the base station side, which is not limited in this disclosure. However, since the process of determining whether the change in the power control signaling indicates that the number of times that the transmission power of the user equipment is relatively increased or decreased is larger than or equal to the predetermined number threshold is performed by the flag generating unit 204 on the user equipment side, if the predetermined number threshold is determined on the base station side and is notified to the user equipment, an additional signaling overhead may be caused. Therefore, the determination process is preferably performed on the user equipment side.

Figure 4:
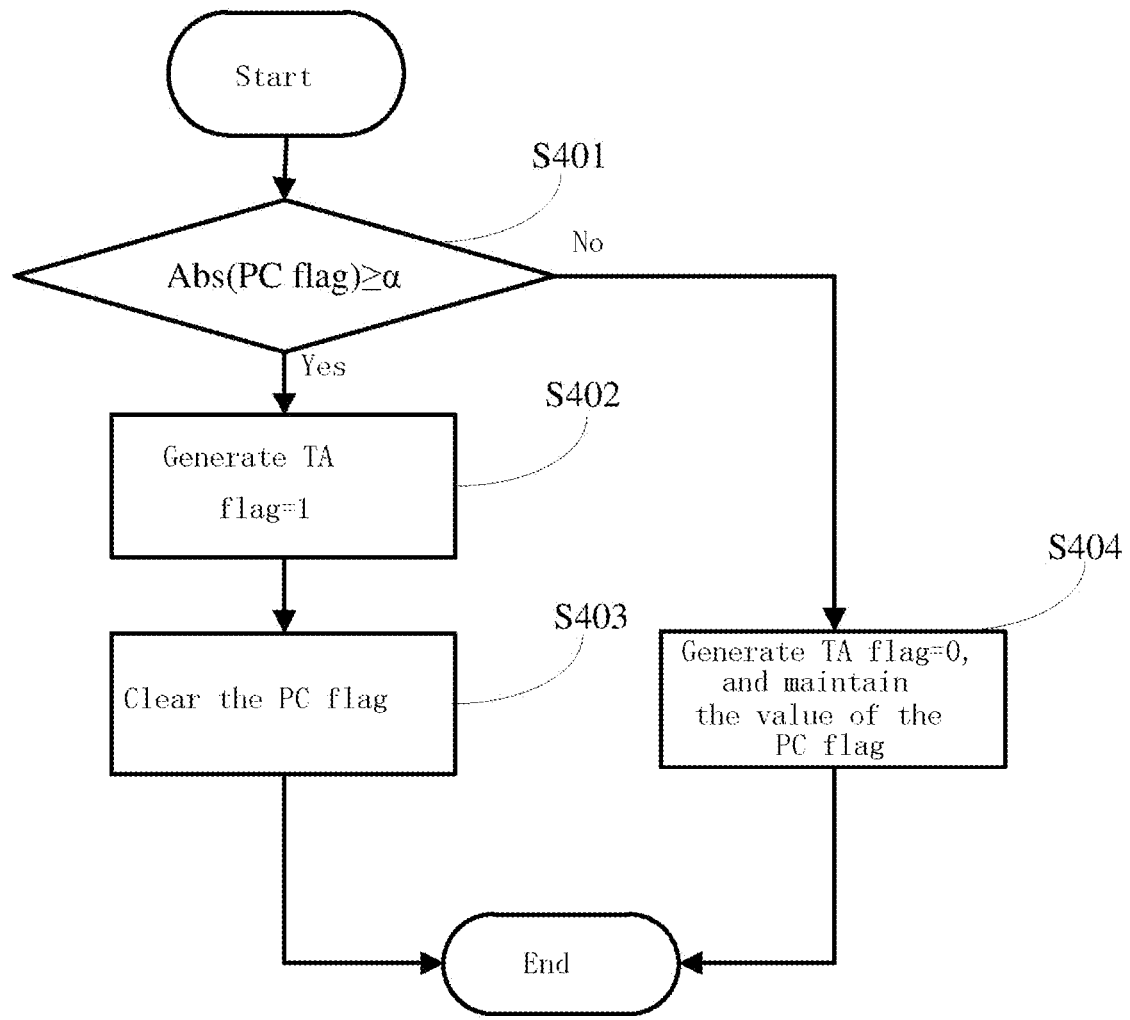
FIG. 4 is a flowchart showing a processing process for generating an asynchronizaiton flag according to an embodiment of the present disclosure.

The process of generating the asynchronization flag is described below in detail with reference to FIG. 4. FIG. 4 is a flowchart showing a processing process for generating an asynchronizaiton flag according to an embodiment of the present disclosure.

As shown in FIG. 4, firstly, each time when the reporting period expires and it is required to report the asynchronization flag to the base station, in step S401, the user equipment determines whether or not the absolute value of the PC flag is greater than or equal to the predetermined number threshold $\alpha$. If it is determined in step S401 that the absolute value of the PC flag is greater than or equal to the predetermined number threshold $\alpha$, it is indicated that the relative distance between the user equipment and the base station changes greatly, which results in the number of times that the transmission power of the user equipment is relatively increased or decreased being greater than or equal to $\alpha$. Therefore, the synchronization time delay caused by the change of the distance exceeds the system tolerance, so that the asynchronization flag of "1" is generated in step S402, that is, TA flag=1. Thus it is indicated to the base station that it is required to adjust TA, so that the user equipment re-makes synchronization with the base station. Next, in step S403, the value of the PC flag is cleared. In contrast, if it is determined in step S401 that the absolute value of the PC flag is less than the predetermined number threshold $\alpha$, it is indicated that the relative distance between the user equipment and the base station does not change greatly, and the number of times that the transmission power of the user equipment is relatively increased or decreased is less than $\alpha$. Therefore, the synchronization time delay generated by the change of the distance does not exceed the system tolerance, so that the asynchronization flag of "0" is generated in step S404, that is, TA flag=0. Thus, it is indicated to the base station that it is unnecessary to adjust the TA, such that the user equipment maintains the current synchronization state and continues data transmission with the base station. In this case, the value of the PC flag maintains unchanged. In this way, by repeatedly performing the processes in steps S401 to S404 in each reporting period, an asynchronization flag indicating the current synchronization state is generated and reported to the base station.

In addition, since the path loss is directly related to the power variation, that is, the change in the path loss also reflects the change of the relative displacement of the user equipment, the process of monitoring of the path loss may also achieves the same object as the process of monitoring the power control signaling. Specifically, the process of monitoring the path loss to determine whether the user equipment needs to re-make uplink synchronization with the base station is substantially the same as the process of monitoring the power control signaling described above with reference to FIGS. 3 and 4, and modifications may be made appropriately by those skilled in the art according to the above principle of the present disclosure in combination with the relationship between the path loss and the power variation, and details thereof are not described herein.

However, itis to be understood that since the user equipment needs to always monitor the power control signaling during the communication process, when the asynchronization flag is generated by monitoring the power control signaling, the uplink synchronization scheme of the present disclosure can be implemented without additionally increasing the processing load. In contrast, if the asynchronization flag is generated by monitoring variables other than power control signaling (for example, the path loss or any other variable that reflects the relative displacement of the user equipment, and the like), the user equipment may be required to perform some additional processes, which may somehow increase the processing load and operational complexity of the user equipment. Therefore, the asynchronization flag is generated preferably by monitoring variation in the power control signaling.

Referring back to FIG. 2, the synchronization unit 206 may be configured to make synchronization with the base station according to a timing advance, which is determined by the base station based on the asynchronizaiton flag.

Specifically, after the asynchronization flag generated by the flag generating unit 204 is transmitted to the base station, if the base station determines, based on the received asynchronization flag, that it is required to adjust the timing advance, then the base station calculates the current time delay of the user equipment, determines a new TA based on the calculated current time delay, and transmits the new TA to the user equipment, so that the synchronization unit 206 in the electronic apparatus on the user equipment side re-makes synchronization with the base station based on the new TA. On the other hand, if the base station determines, based on the received asynchronization flag, that it is unnecessary to adjust the TA, then no new TA is transmitted to the user equipment. If the user equipment does not receive any new TA until the TAT expires, the user equipment maintains the current synchronization state with the base station and continues the data transmission. A process of re-making uplink synchronization based on the new TA is the same as that in the conventional technology, and is not described herein.

It is to be noted that the electronic apparatus 200 herein may be implemented at a chip level, or may be implemented at an apparatus level by including other external components. For example, the electronic apparatus 200 may operate as a complete machine to function as a serving base station, and may include a communication unit 208 (which is optional and is denoted by a dashed block) for performing data transmission and reception operations with an external device. For example, the communication unit 208 may be configured to perform communication with the base station, which includes: transmitting information regarding performance parameters to the base station, receiving reporting periods from the base station, transmitting a generated asynchronization flag to the base station, receiving an adjusted TA from the base station, and the like. It is to be further noted that the specific implementation of the communication unit 208 is not limited here, and it may include one or more communication interface(s) for realizing communication with different external devices.

In addition, it is further to be noted that the various functional units described above are merely logical modules divided according to the specific functions thereof, and are not intended to limit the specific implementations. In actual implementations, the above functional units may be implemented as separate physical entities, or may be implemented by a single entity (for example, a processor (a CPU, a DSP or the like), an integrated circuit, or the like).

In addition, it is to be noted that although the apparatus embodiments of the present disclosure are described above with reference to functional block diagrams shown in FIG. 1 and FIG. 2, these are exemplary rather than restrictive. A person skilled in the art may modify the shown functional configuration examples according to the principle of the present disclosure. For example, functional modules in various embodiments may be added, deleted, modified, combined or the like, and all of such modifications are considered to fall within the scope of the present disclosure.

In order to further facilitate understanding of the operation principle according to the present disclosure, an information interaction process between the user equipment and the base station for implementing the open-loop uplink synchronization scheme according to the present disclosure is described below with reference to information interaction flowcharts shown in FIGS. 5 and 6.

[3. Information Interaction Process According to an Embodiment of the Present Disclosure]

(3-1. Information Interaction Process for Implementing Initialization of Uplink Synchronization)

Figure 5:
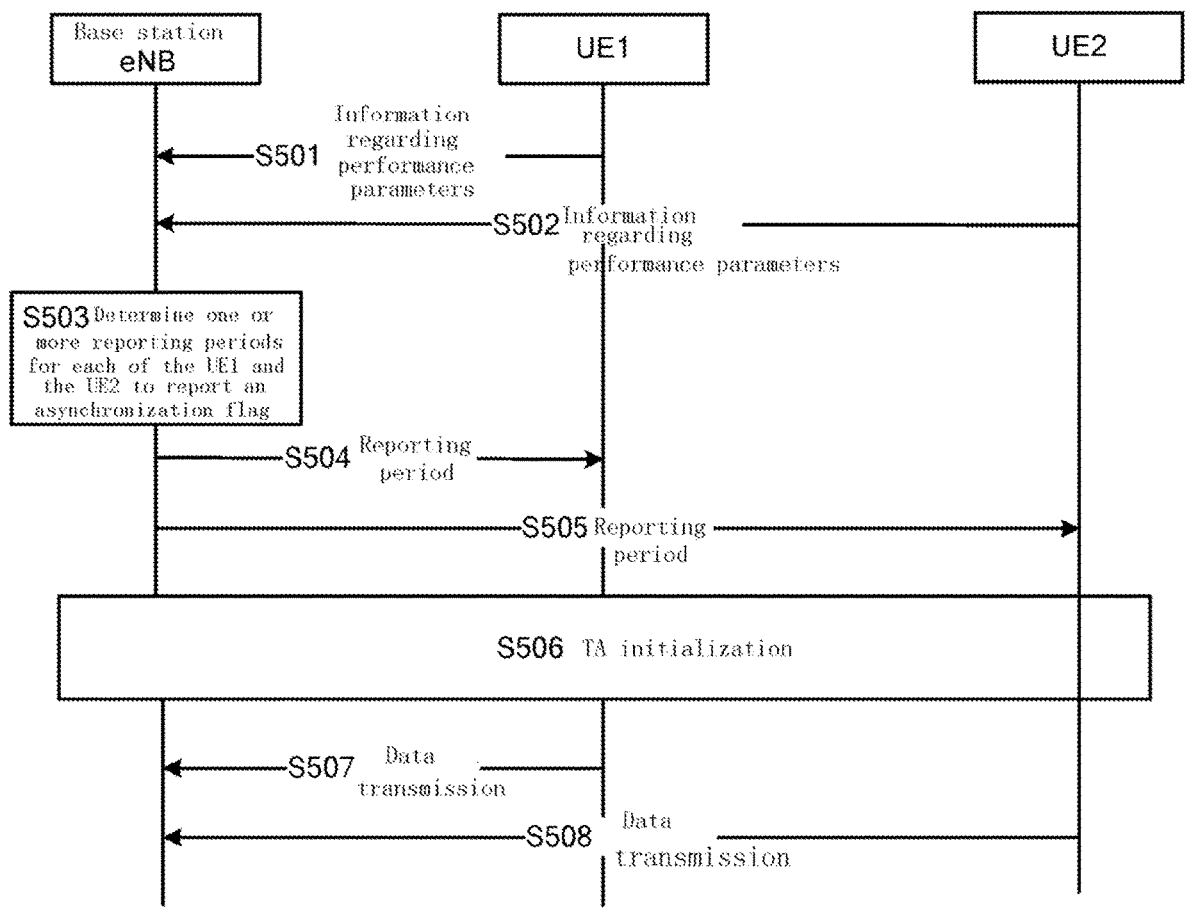
FIG. 5 is a flowchart showing an information interaction process for implementing initialization of uplink synchronizaiton according to an embodiment of the present disclosure.

FIG. 5 is a flowchart showing an information interaction process for implementing initialization of uplink synchronization according to an embodiment of the present disclosure. This initialization process may be performed after the random access process or during the random access process.

As shown in FIG. 5, it is assumed that there are two user equipments UE1 and UE2 in the system to make uplink synchronization with the base station. Firstly, in steps S501 and S502, the UE1 and the UE2 respectively report their respective information regarding performance parameters to the base station eNB, where the information regarding performance parameters may include information regarding one or more groups of performance parameters. Then, in step S503, the base station eNB determines, according to the received information regarding performance parameters, one or more reporting periods for each of the UE1 and the UE2 to report an asynchronization flag, and in steps S504 and S505, the base station eNB notifies the determined one or more reporting periods to the UE1 and the UE2 respectively. Next, in step S506, the timing advance TA is initialized to achieve initial synchronization of the UE1 and the UE2 with the base station. The initial synchronization process is the same as that in the conventional technology, which is not repeated herein. After the initial synchronization with the base station is completed, in steps S507 and S508, the UE1 and UE2 respectively perform uplink data transmission with the base station.

An information interaction process for maintaining uplink synchronization according to an embodiment of the present disclosure is described below with reference to FIG. 6.

(3-2. Information Interaction Process for Maintaining Uplink Synchronization According to an Embodiment of the Present Disclosure)

Figure 6:
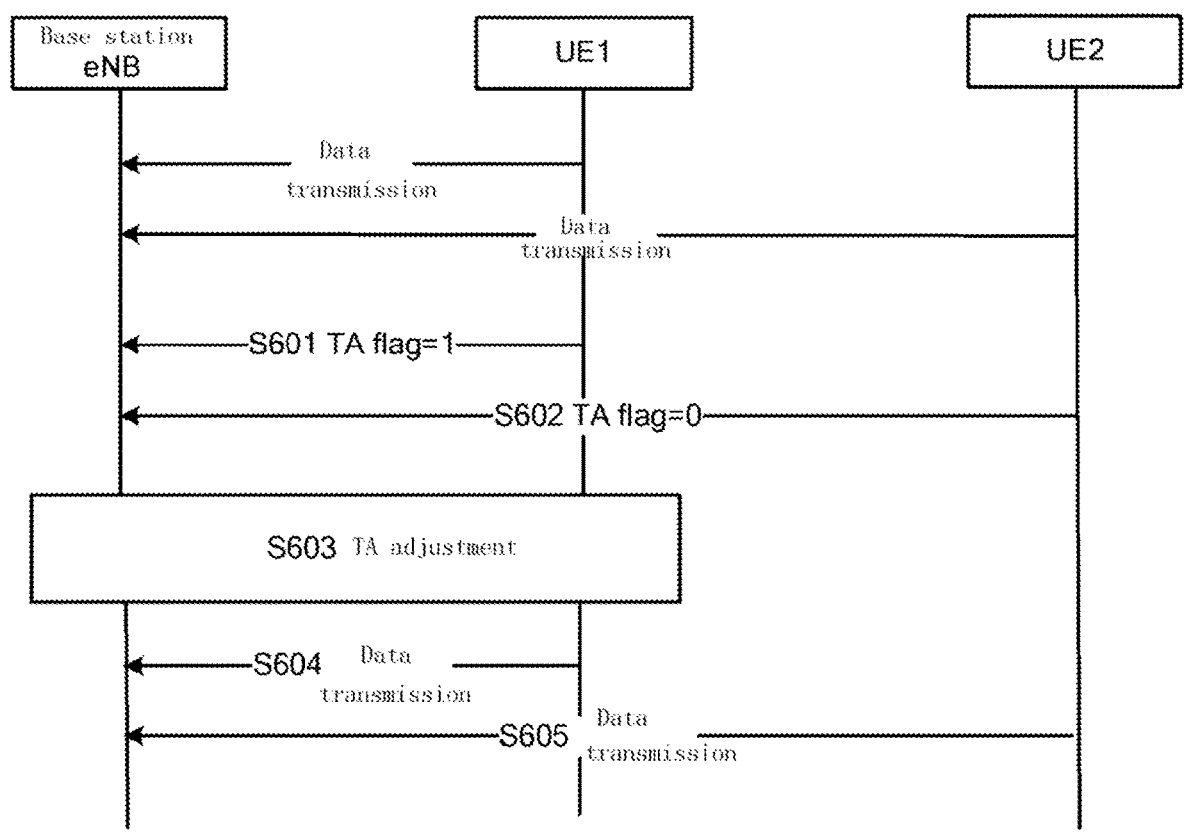
FIG. 6 is a flowchart showing an information interaction process for maintaining uplink synchronizaiton according to an embodiment of the present disclosure.

FIG. 6 is a flowchart showing an information interaction process for maintaining uplink synchronization according to an embodiment of the present disclosure.

As shown in FIG. 6, in the process in which the user equipment performs data transmission after making initial uplink synchronization with the base station, the user equipment reports, based on the reporting period of the asynchronization flag notified by the base station and the currently used group of performance parameters, its current asynchronization flag (that is, the TA flag) within the corresponding reporting period to the base station (see steps S601 and S602 in FIG. 6). If the value of the TA flag is 1 (for example, for the UE1 in FIG. 6), it is indicated that the synchronization time delay between the user equipment UE1 and the base station exceeds the system tolerance. If the value of the TA flag is 0 (for example, for the UE2 in FIG. 6), it is indicated that the synchronization time delay between the user equipment UE2 and the base station is not so large, and the system performance is not affected. Then, the base station performs TA adjustment for the user equipment (for example, the UE1 in FIG. 6) whose synchronization time delay exceeds the system tolerance according to the received asynchronization flag. Specifically, in step S603, the base station eNB performs TA adjustment for the user equipment UE1, so that the user equipment UE1 re-makes uplink synchronization with the base station based on the adjusted TA. For the specific TA adjustment process, reference may be made to the above description of the electronic apparatus on the base station side, which is not repeated here. After re-making the uplink synchronization with the base station, in step S604, the user equipment UE1 resumes data transmission to the base station. On the other hand, for the user equipment (for example, the UE2 in FIG. 6) whose synchronization time delay is still within a range of the system tolerance, the base station does not perform TA adjustment, so that the user equipment UE2 maintains the previous synchronization state and continues the data transmission (see Step S605 in FIG. 6).

Corresponding to the above apparatus embodiments, a method in a wireless communication system according to an embodiment of the present disclosure is described below with reference to FIGS. 7 and 8.

[4. Method on a Base Station Side in a Wireless Communication System According to an Embodiment of the Present Disclosure]

Figure 7:
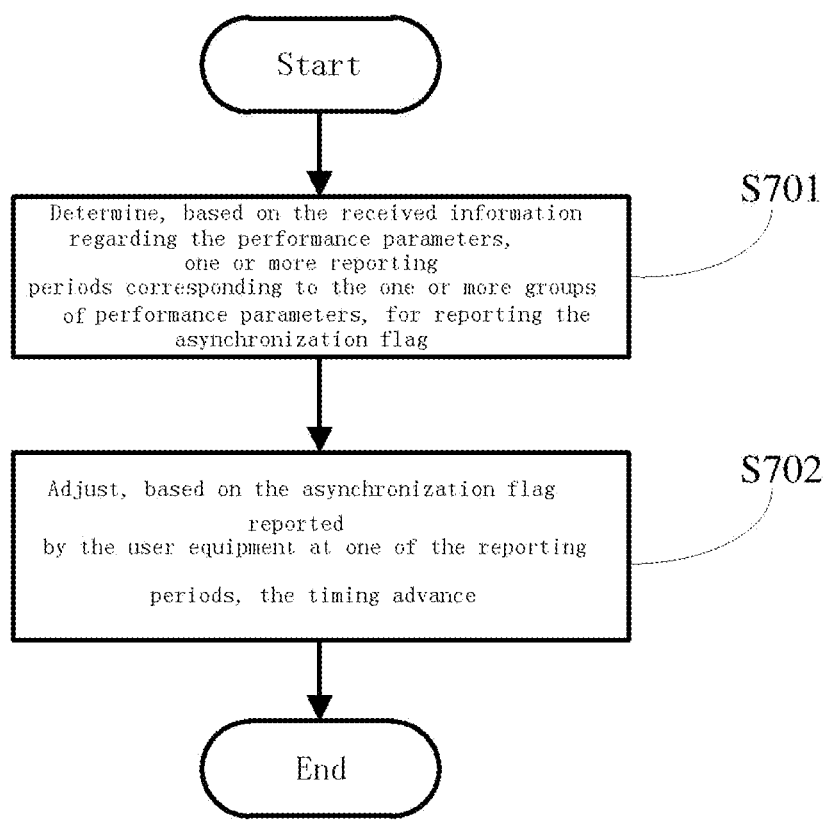
FIG. 7 is a flowchart showing a process example of a method on a base station side in a wireless communication system according to an embodiment of the present disclosure.

FIG. 7 is a flowchart showing a process example of a method on a base station side in a wireless communication system according to an embodiment of the present disclosure.

As shown in FIG. 7, the method starts at step S701. In step S701, one or more reporting periods for a user equipment to report an asynchronization flag is determined based on information regarding one or more groups of performance parameters from the user equipment. Here, the one or more reporting periods are to be notified to the user equipment, and the asynchronizaiton flag indicates whether a synchronization time delay between the user equipment and a base station exceeds a predetermined system tolerance. For the specific determination process and the notification process of the reporting period, reference may be made to the description of the electronic apparatus on the base station side, and details thereof are not described here.

Next, the method proceeds to step S702. In step S702, a timing advance is adjusted based on the asynchronization flag reported by the user equipment at one of the one or more reporting periods. Specifically, if the asynchronization flag indicates that the synchronization time delay exceeds the predetermined system tolerance (for example, if the asynchronization flag is 1), the TA is adjusted, and the adjusted TA is notified to the user equipment, so that the user equipment makes synchronization with the base station based on the adjusted TA. Alternatively, if the asynchronization flag indicates that the synchronization time delay does not exceed the predetermined system tolerance (for example, if the asynchronization flag is 0), the process ends, so that the user equipment maintains the current synchronization state and continues the data transmission to the base station.

It is to be noted that the method embodiment described here corresponds to the apparatus embodiment described above with reference to FIG. 1, and thus for the contents which are not described in detail here, reference can be made to the above description at the corresponding positions which is not repeated here.

[5. Method on a User Equipment Side in a Wireless Communication System According to an Embodiment of the Present Disclosure]

Figure 8:
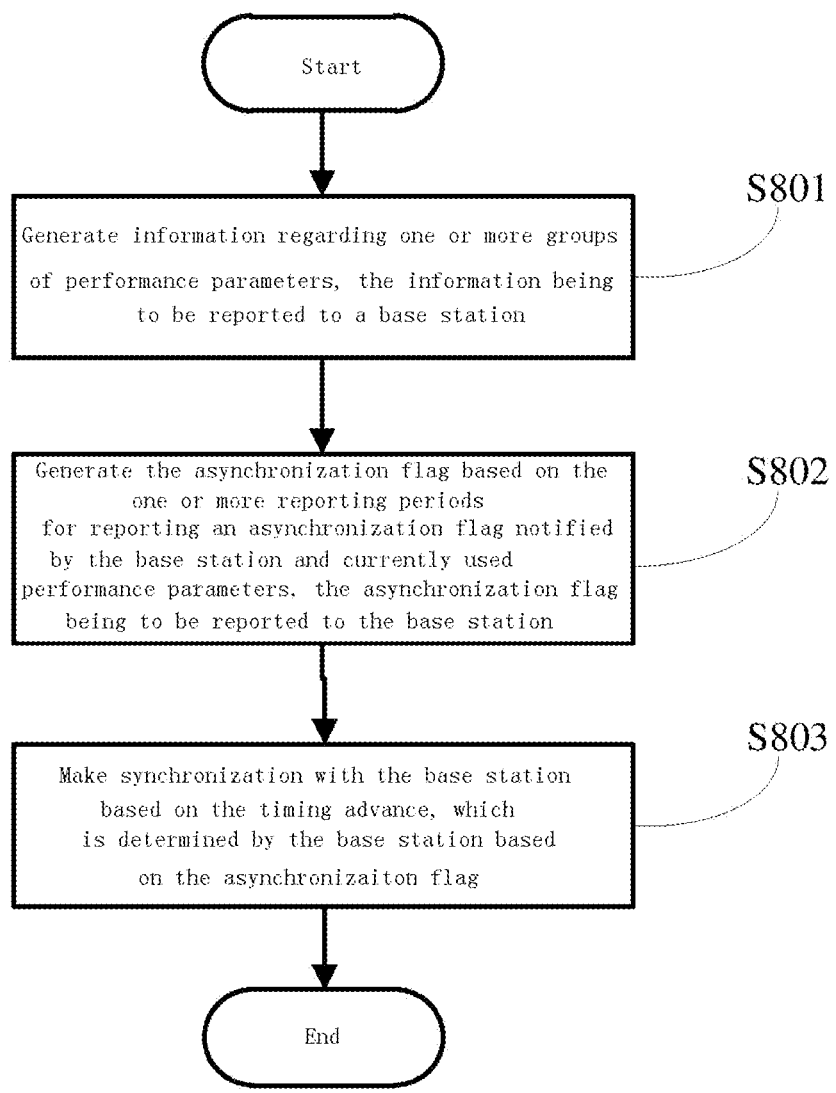
FIG. 8 is a flowchart showing a process example of a method on a user equipment side in a wireless communication system according to an embodiment of the present disclosure.

FIG. 8 is a flowchart showing a process example of a method on a user equipment side in a wireless communication system according to an embodiment of the present disclosure.

As shown in FIG. 8, the method starts at step S801. In step S801, the user equipment generates information regarding one or more groups of performance parameters of the user equipment, which is to be reported to a base station. Preferably, the one or more groups of performance parameters may include only one group of performance parameters currently used by the user equipment or all groups of performance parameters supported by the user equipment. The information regarding performance parameters may be in the form of indexes indicating respective groups of performance parameters that are determined based on a pre-stored table, so as to reduce signaling overheads.

Next, the method proceeds to step S802. In step S802, based on one or more reporting periods for reporting the asynchronization flag that are notified from the base station and the group of performance parameters currently used by the user equipment, the user equipment generates, when the reporting period corresponding to the currently used group of performance parameters expires, the asynchronization flag indicating whether a synchronization time delay between the user equipment and the base station exceeds a system tolerance. The generated asynchronization flag is to be reported to the base station, such that the base station adjusts the TA based on the asynchronization flag. For the specific generation process of the asynchronization flag, reference may be made to the description of the electronic apparatus on the user equipment side with reference to FIGS. 2 to 4, and details thereof are not described here.

Then, the method proceeds to step S803. In step S803, the user equipment makes synchronization with the base station based on the received timing advance, which is determined by the base station based on the asynchronizaiton flag. Specifically, for example, if the asynchronization flag is 1, the base station adjusts the timing advance and notifies the user equipment of the adjusted, new timing advance, so that the user equipment re-makes uplink synchronization with the base station based on the new timing advance. On the other hand, if the asynchronization flag is 0, the base station does not adjust the timing advance and does not notify the user equipment. When the TAT expires, if no new timing advance is received by the user equipment, the user equipment maintains the current synchronization state and continues the data transmission.

It is to be noted that the method embodiment described here corresponds to the apparatus embodiment described above with reference to FIGS. 2 to 4, and thus for the contents which are not described in detail here, reference can be made to the above description at the corresponding positions, which is not repeated here.

In addition, it is also to be understood that flowcharts or information interaction flowcharts described above with respect to FIGS. 3 to 8 are exemplary, rather than restrictive. A person skilled in the art may modify the illustrated examples of the processing flows according to the principle of the present disclosure. For example, steps in various embodiments may be added, deleted, modified, combined or the like, and all of such modifications are considered to fall within the scope of the present disclosure.

It is to be understood that the storage medium and the machine-executable instructions in a program product according to an embodiment of the present disclosure may be configured to perform methods corresponding to the above apparatus embodiments, and thus for the contents which are not described in detail here, reference may be made to the above description at corresponding portions, which is not repeated.

Accordingly, the present disclosure also provides a storage medium for carrying the program product which includes the machine-readable instruction codes. The storage medium includes but is not limited to a floppy disk, an optical disk, a magneto-optical disk, a memory card, a memory rod and the like.

[6. Technical Effect and Simulation of the Present Disclosure]

According to the embodiments of the present disclosure described above, with the open-loop uplink synchronization scheme according to the present disclosure, at least one or more of the following technical effects can be achieved.

(1) In the open-loop uplink synchronization scheme according to the present disclosure, only in a case where the user equipment determines that the synchronization time delay caused by the relative displacement of the user equipment exceeds the predetermined system tolerance and thus the system performance is significantly degraded, the user equipment requests the base station to adjust the TA so as to re-make uplink synchronization with the base station. Therefore, compared with the conventional closed-loop uplink synchronization scheme implemented by the cooperation of TAT and TAC, the signaling overhead caused by unnecessary TA adjustment and resynchronization processes can be reduced while the system performance is ensured, and the effect of reducing the signaling overhead is especially noticeable in a new waveform system that does not have a high requirement regarding the synchronization time delay.

(2) For the new waveform system, the signaling overhead can be further reduced by setting the period at which the user equipment reports the asynchronization flag to be long (for example, 1000 ms or longer, longer than the length of the TAT).

(3) For a conventional waveform system with a high synchronization requirement, by setting the period for the user equipment to report the asynchronization flag to be less than or equal to the length of the TAT, the compatibility with such a conventional waveform system can be achieved, and the exact synchronization required by the conventional waveform system can be ensured.

(4) By determining the time delay sensitivity of the currently used waveform system based on the information regarding the performance parameters (in particular, information of the waveform type therein), it can be switched between the existing synchronization scheme and the synchronization scheme of the present disclosure, thereby achieving good applicability and compatibility.

(5) The parameters (including but not limited to the reporting period, the distance threshold, the adjustment number threshold, and the like) can be flexibly adjusted according to actual needs to optimize the system performance.

In order to facilitate a more intuitive understanding of the advantages of the technical solutions of the present disclosure over the conventional technology, a comparison between the simulation results for the technical solutions of the present disclosure and the technical solutions of the conventional technology in terms of signaling overheads and system performance is described below as an example.

According to the LTE standard, the maximum number of retransmissions of HARQ is 5 by default, and the length of a Round-Trip Time (RTT) under the Frequency Division Duplexing (FDD) model is 8 ms. To support different moving speeds, the length of the TAT is set to 500 ms, 750 ms, 1280 ms, 1920 ms, 2560 ms, 5120 ms, 10240 ms, and infinity, respectively. The TAC is of 6 bits and the ACK/NACK is of 1 bit.

If the TAC is correctly received by the user equipment after 5 retransmissions at the end of the TAT, the signaling overhead may be expressed as (the number of bits of the TAC+the number of bits of the ACK/NACK)*the number of transmissions/the length of the TAT, that is, the length of (6+1)*6/TAT. The signaling overheads under the respective settings of the TAT length are 84 bit/s, 56 bit/s, 33 bit/s, 21 bit/s, 16 bit/s, 8 bit's, and 4 bits, which respectively correspond to the cases of the TAT being of 500 ms, 750 ms, 1280 ms, 1920 ms, 2560 ms, 5120 ms, and 10240 ms. However, in practice, the TAC may be received correctly in the first transmission, and the TAT is restarted. According to some simulation tests in the conventional technology, if the simulation time period is set to 5000 ms, the average numbers of restarts are about 95, 62, and 38, which respectively correspond to the cases of the TAT length being 500 ms, 750 ms, and 1280 ms. Here, it is assumed that there is only one transmission per TAT period, and based on the provisions of 3GPP, TAC information is scheduled to be transmitted at the end of each TAT period. Therefore, in this example, the signaling overhead may be expressed as (an average number of restarts*the number of bits of TAC)/simulation time period, that is, (an average number of restarts*6)/5. Hence, the signaling overheads under the respective settings of the TAT length are approximately 114 bits, 74 bit/s, and 45 bit/s, which respectively correspond to the cases of the TAT length being 500 ms, 750 ms, and 1280 ms.

It can be seen from the above analysis that, according to the uplink synchronization scheme of the conventional technology, the signaling overhead ranges between 114 bit/s and 4 bit/s according to different communication environments.

In contrast, according to the synchronization scheme of the present disclosure, the TA is updated only when the asynchronization flag reported by the user equipment according to the reporting period indicates that it is required to adjust the TA. Assuming that the reporting period is set to be equal to a minimum TAT length, that is, 500 ms, and the TAC is 6 bits, it is can be derived that the signaling overhead of the synchronization scheme of the present disclosure is approximately 6/0.5=12 bit/s. This signaling overhead is much smaller than the signaling overheads in most TAT cases in the conventional technology. Moreover, in practice, for a communication system that does not have a high synchronization requirement, the reporting period may generally be set to be much larger than the length of the TAT. Therefore, the actual signaling overhead according to the synchronization scheme of the present disclosure is smaller. In addition, in the case that the asynchronization flag indicates that it is unnecessary to adjust the TA, neither the base station nor the user equipment needs to perform a resynchronization process (including adjustment and transmission of the TA, and re-synchronization by the user equipment based on the TA), and thus the signaling overhead and processing overhead can be further reduced with the synchronization scheme of the present disclosure.

Figure 9:
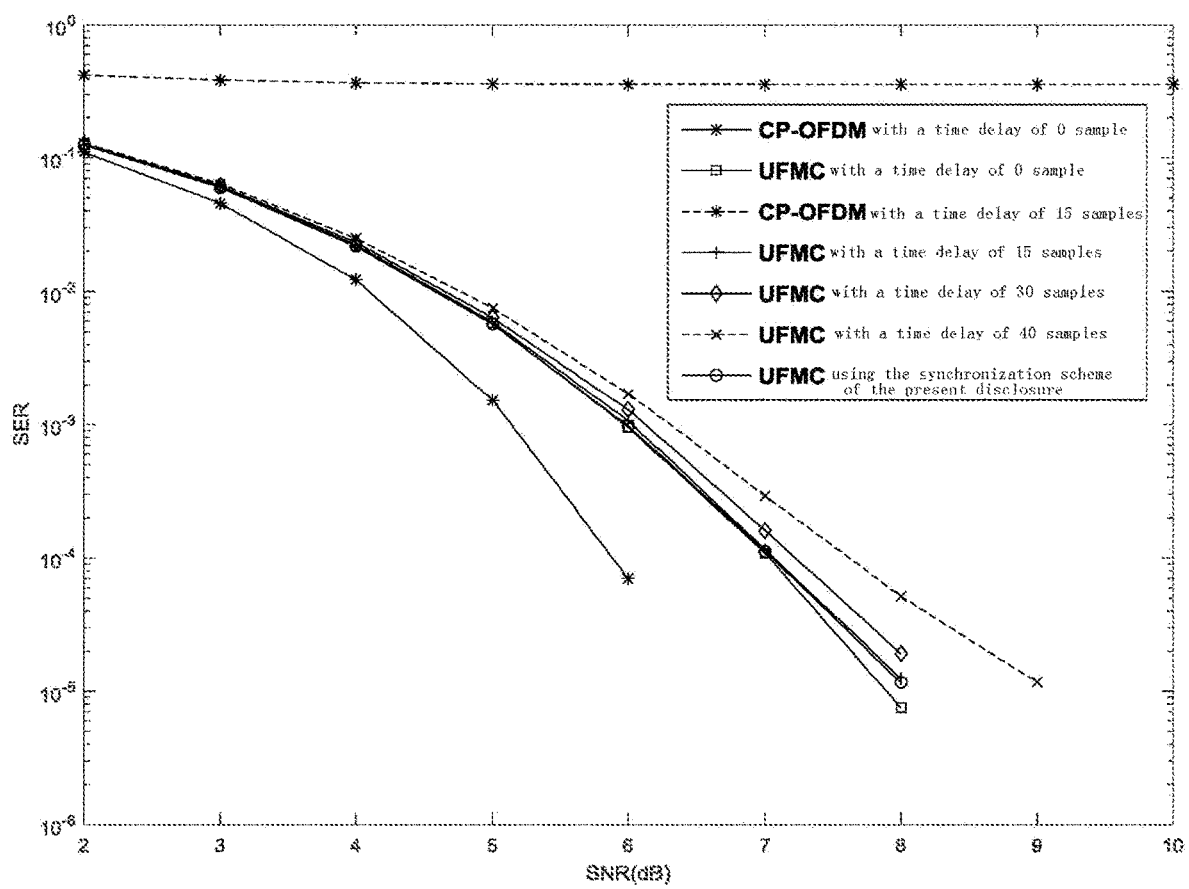
FIG. 9 is a schematic diagram showing a comparison between simulation results of system performances of a synchronization scheme according to the present disclosure and a synchronization scheme according to the conventional technology.

FIG. 9 is a schematic diagram showing a comparison between simulation results of system performances of a synchronization scheme of the present disclosure and a synchronization scheme of the conventional technology.

The main simulation parameters are set as follows. Two user equipments: a UE1 and a UE2; resource allocation: the UE1 uses 5 RBs, the UE2 uses 5 RBs, and each RB has 12 subcarriers, where RB represents a resource block; time delays: 0–40 samples and the scheme of the present disclosure; waveform systems: UFMC (Chebyshev filter, filter length=74) and OFDM (CP length=73).

The simulation result is as shown in FIG. 9. FIG. 9 shows the system error ratio (SER) in each of the following cases: a case where the synchronization scheme of the present disclosure is applied in a UFMC system; a case of an exact-synchronization scheme in a CP-OFDM system; a case of a synchronization scheme in a CP-OFDM system in which there is a time delay of 15 samples; a case of an exact-synchronization scheme in a UFMC system; and a case of a synchronization scheme in a UFMC system in which there is a time delay of 15 to 40 samples. The case of an exact-synchronization scheme may be approximately deemed as a case where the conventional synchronization scheme of the LTE system is adopted. It can be seen from FIG. 9 that the OFDM system is sensitive to a time delay, and its system performance is degraded in the presence of the time delay. In contrast, there is almost no difference in the system performance of the UFMC system in the presence of time delays of 0 to 30 samples. In the UFMC system, the synchronization scheme of the present disclosure can achieve a system performance similar to that of the exact-synchronization scheme with a zero time delay (which is equivalent to the system performance achieved by using the conventional synchronization scheme of the LTE system in the UFMC system), but with a lower signaling overhead. That is, with the synchronization scheme of the present disclosure, the system performance can be ensured while the signaling overhead is greatly reduced, which is particularly significant in the new waveform system that is insensitive to a synchronization time delay.

[7. Computing Device for Implementing the Electronic Apparatus and the Method According to the Present Disclosure]

Figure 10:
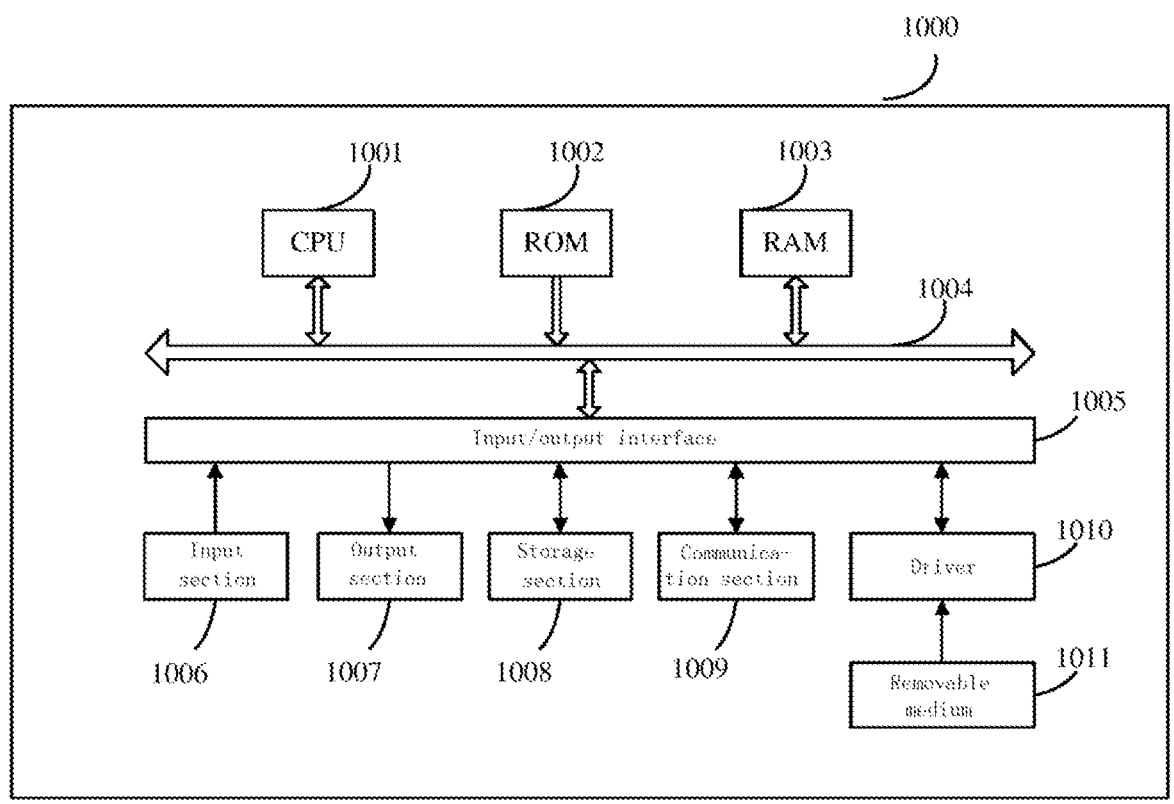
FIG. 10 is a block diagram showing an exemplary structure of a personal computer which can be used as an information processing device according to an embodiment of the present disclosure.

In addition, it is further to be noted that the above-described series of processing and apparatuses may also be implemented by software and/or firmware. In the case of implementation in software and/or firmware, a program constituting the software is installed from a storage medium or a network to a computer with a dedicated hardware structure, e.g., a general purpose personal computer 1000 illustrated in FIG. 10, which can perform various functions when various programs are installed thereon. FIG. 10 is a block diagram showing an exemplary structure of a personal computer that can be used as an information processing device according to an embodiment of the present disclosure.

In FIG. 10, a central processing unit (CPU) 1001 executes various processes according to the program stored in a read only memory (ROM) 1002 or the program loaded from the storage section 1008 to a random access memory (RAM) 1003. In the RAM 1003, the data required by CPU 1001 to execute various processing is also stored as necessary.

The CPU 1001, the ROM 1002 and the RAM 1003 are connected with each other via a bus 1004. An input/output interface 1005 is also connected to the bus 1004.

The following sections are connected to the input/output interface 1005: an input section 1006 including a keyboard, a mouse and the like; an output section 1007 including a display such as a cathode ray tube (CRT), a liquid crystal display (LCD) and the like, a loudspeaker, and the like; a memory section 1008 including a hard disc and the like; and a communication section 1009 including a network interface card such as a LAN card, a modem and the like. The communication section 1009 performs communication processing via a network such as the Internet.

A driver 1010 may also be connected to the input/output interface 1005 as needed. A removable medium 1011, e.g., a magnetic disk, an optical disk, an magneto optical disk, a semiconductor memory, etc., can be installed on the driver 1010 as needed so that a computer program fetched therefrom can be installed into the storage section 1008 as needed.

In the case that the foregoing series of processes are performed in software, a program constituting the software is installed from a network, e.g., the Internet, or a storage medium, e.g., the removable medium 1011.

It is to be understood by those skilled in the art that the storage medium is not limited to the removable medium 1011 shown in FIG. 10 in which the program is stored and which is distributed separately from the apparatus so as to provide the program to the user. The removable medium 1011, for example, may include a magnetic disk including a Floppy Disk (registered trademark); an optical disk including a Compact Disk Read Only Memory (CD-ROM) and a Digital Versatile Disc (DVD); a magneto-optical disk including a MiniDisc (MD) (registered trademark); and a semiconductor memory. Alternatively, the storage medium may be a ROM 1002, a hard disk included in the storage section 1008, etc., which has a program stored therein and is distributed to the user along with an apparatus in which it is incorporated.

[8. Application Examples of the Technology According to the Present Disclosure]

The technology of the present disclosure may be applied to various products including a base station and a user equipment. Specifically, a base station may be realized as an evolved Node B (eNB) of any type, such as a macro eNB and a small eNB. The small eNB may be an eNB such as a pico eNB, a micro eNB and a home (femto) eNB that covers a cell smaller than a macro cell. Alternatively, the base station may also be implemented as a base station of any other type, such as a NodeB and a base transceiver station (BTS). The base station may include a main body (that is also referred to as a base station device) configured to control wireless communication, and one or more remote radio heads (RRH) disposed in a different place from the main body. In addition, various types of terminals, which will be described below, may each operate as the base station by temporarily or semi-persistently executing a base station function.

The user equipment may be realized as a mobile terminal (such as a smartphone, a tablet personal computer (PC), a notebook PC, a portable game terminal, a portable/dongle type mobile router, and a digital camera), or an in-vehicle terminal (such as a car navigation device). The user equipment may also be realized as a terminal (that is also referred to as a machine type communication (MTC) terminal) that performs machine-to-machine (M2M) communication. Furthermore, the user equipment may be a wireless communication module (such as an integrated circuit module including a single die) mounted on each of the terminals.

Application examples according to the present disclosure are described below with reference to FIGS. 11 to 14.

(8-1. Application Examples of a Base Station)

First Application Example

Figure 11:
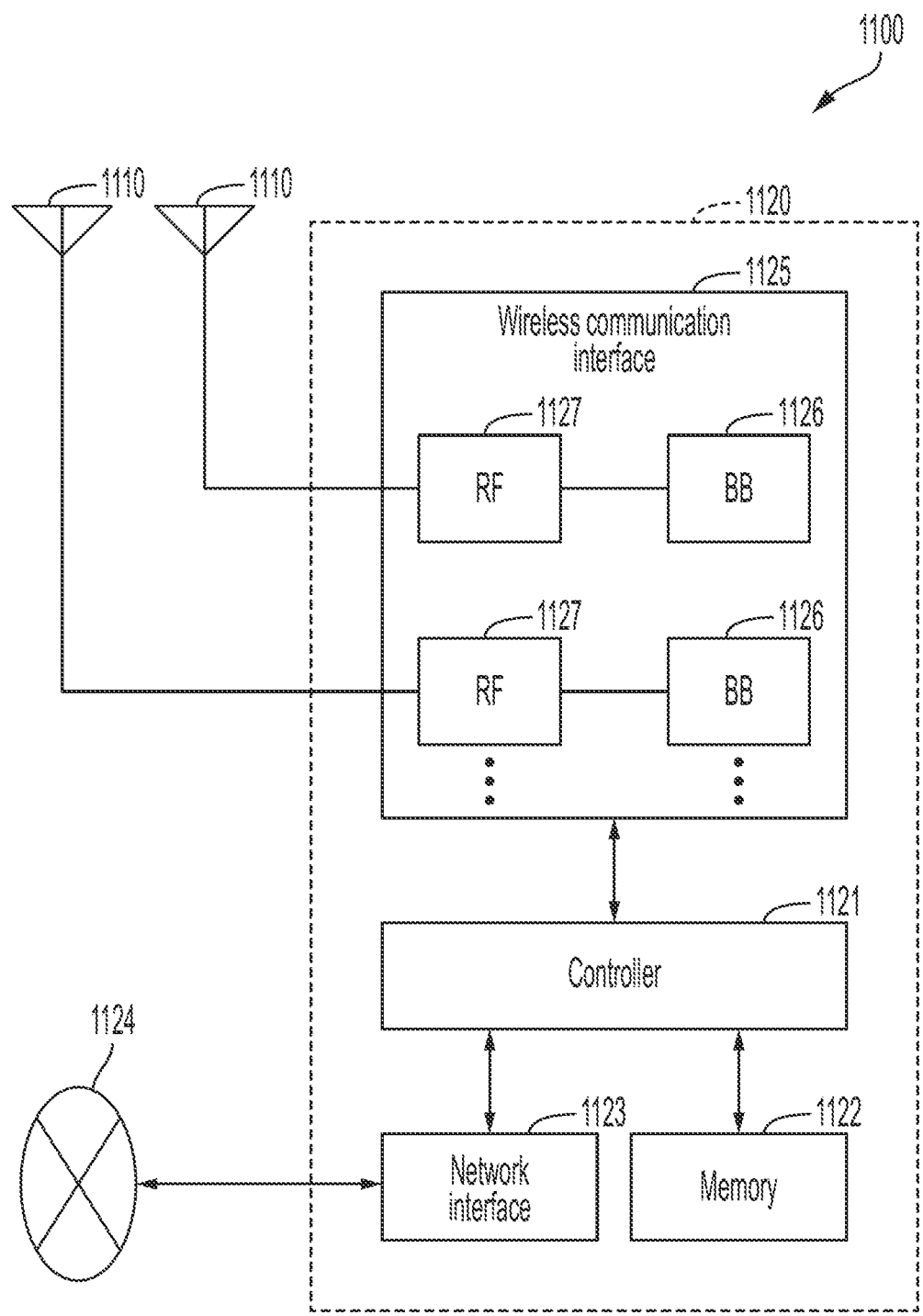
FIG. 11 is a block diagram showing a first example of a schematic configuration of an evolved node (eNB) to which the technology of the present disclosure may be applied.

FIG. 11 is a block diagram showing a first example of a schematic configuration of an eNB to which the technology of the present disclosure may be applied. An eNB 1100 includes one or more antennas 1110 and a base station device 1120. The base station device 1120 and each of the antennas 1110 may be connected with each other via an RF cable.

Each of the antennas 1110 includes one or more antenna elements (such as multiple antenna elements included in a multiple-input multiple-output (MIMO) antenna), and is used for transmitting and receiving a radio signal by the base station device 1120. The eNB 1100 may include the multiple antennas 1110, as shown in FIG. 11. For example, the multiple antennas 1110 may be compatible with multiple frequency bands used by the eNB 1100. Although FIG. 11 illustrates an example in which the eNB 1100 includes multiple antennas 1110, the eNB 1100 may also include a single antenna 1110.

The base station device 1120 includes a controller 1121, a memory 1122, a network interface 1123, and a wireless communication interface 1125.

The controller 1121 may be a CPU or a DSP and control various functions of higher layers of the base station device 1120. For example, the controller 1121 generates a data packet based on data in a signal processed by the wireless communication interface 1125, and transfers the generated packet via a network interface 1123. The controller 1121 may bundle data from multiple baseband processors to generate bundled packet, and transfer the generated bundled packet. The controller 1121 may have logical functions of performing control such as radio resource control, radio bearer control, mobility management, admission control, and scheduling. The control may be performed in conjunction with an adjacent eNB or a core network node. The memory 1122 includes RAM and ROM, and stores a program that is executed by the controller 1121, and various types of control data (such as a terminal list, transmission power data, and scheduling data).

The network interface 1123 is a communication interface for connecting the base station device 1120 to a core network 1124. The controller 1121 may communicate with a core network node or another eNB via the network interface 1123. In that case, the eNB 1100 and the core network node or the other eNB may be connected to each other through a logical interface (such as an S1 interface and an X2 interface). The network interface 1123 may also be a wired communication interface or a wireless communication interface for radio backhaul. If the network interface 1123 is a wireless communication interface, it may use a higher frequency band for wireless communication than a frequency band used by the wireless communication interface 1125.

The wireless communication interface 1125 supports any cellular communication scheme (such as Long Term Evolution (LTE) and LTE-Advanced), and provides wireless connection to a terminal positioned in a cell of the eNB 1100 via the antenna 1110. The wireless communication interface 1125 may typically include, for example, a base band (BB) processor 1126 and an RF circuit 1127. The BB processor 1126 may perform, for example, coding/decoding, modulation/demodulation and multiplexing/de-multiplexing, and perform various types of signal processes of the layers (for example L1, media access control (MAC), radio link control (RLC) and packet data convergence protocol (PDCP)). Instead of the controller 1121, the BB processor 1126 may have a part or all of the above-described logical functions. The BB processor 1126 may be a memory that stores the communication control program, or a module that includes a processor and related circuitry configured to perform the program. In this way, the function of the BB processor 1126 may be changed when the programs are updated. The module may be a card or a blade that is inserted into a slot of the base station device 1120. Alternatively, the module may be a chip that is mounted on the card or the blade. Meanwhile, the RF circuit 1127 may include, for example, a frequency mixer, a filter and an amplifier, and transmit and receive a radio signal via the antenna 1110.

As shown in FIG. 11, the wireless communication interface 1125 may include multiple BB processors 1126. For example, multiple BB processors 1126 may be compatible with multiple frequency bands used by the eNB 1100. As shown in FIG. 11, the wireless communication interface 1125 may include multiple RF circuits 1127. For example, the multiple RF circuits 1127 may be compatible with multiple antenna elements. Although an example in which the wireless communication interface 1125 includes multiple BB processors 1126 and multiple RF circuits 1127 is shown in FIG. 11, the wireless communication interface 1125 may also include a single BB processor 1126 or a single RF circuit 1127.

Second Application Example

Figure 12:
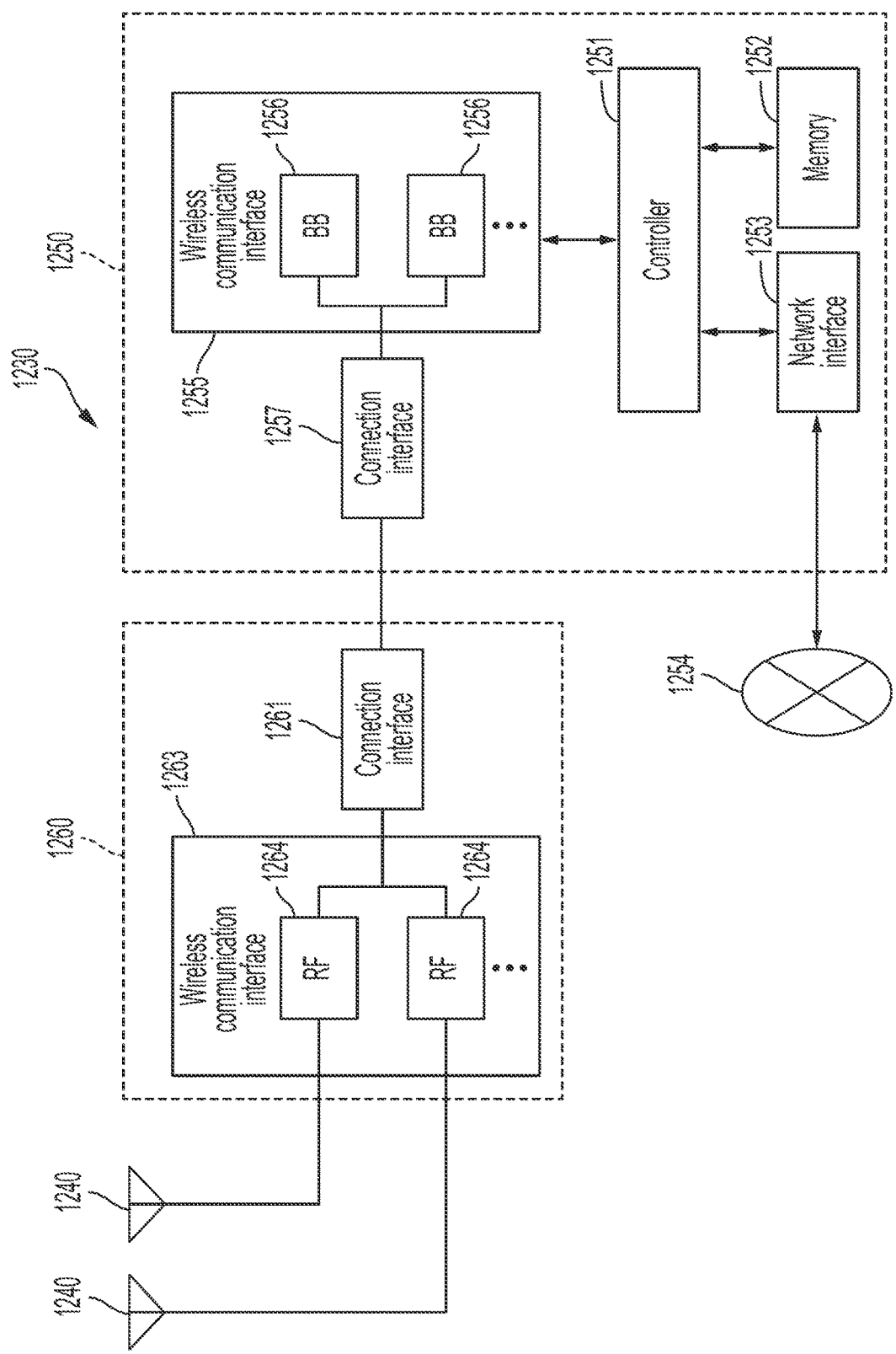
FIG. 12 is a block diagram showing a second example of a schematic configuration of the eNB to which the technology of the present disclosure may be applied.

FIG. 12 is a block diagram showing a second example of a schematic configuration of an eNB to which the technology according to the present disclosure may be applied. An eNB 1230 includes one or more antennas 1240, a base station device 1250 and an RRH 1260. Each antenna 1240 and the RRH 1260 may be connected to each other via an RF cable. The base station device 1250 and the RRH 1260 may be connected to each other via a high-speed line such as a fiber cable.

Each of the antennas 1240 includes one or more antenna elements (such as the multiple antenna elements included in the MIMO antenna), and is used for transmitting and receiving the radio signal by the RRH 1260. As shown in FIG. 12, the eNB 1230 may include multiple antennas 1240. For example, the multiple antennas 1240 may be compatible with multiple frequency bands used by the eNB 1230. Although an example in which the eNB 1230 includes multiple antennas 1240 is shown in FIG. 12, the eNB 1230 may also include a single antenna 1240.

The base station device 1250 includes a controller 1251, a memory 1252, a network interface 1253, a wireless communication interface 1255, and a connection interface 1257. The controller 1251, the memory 1252, and the network interface 1253 are the same as the controller 1121, the memory 1122, and the network interface 1123 described with reference to FIG. 11.

The wireless communication interface 1255 supports any cellular communication solution (such as LTE and LTE-advanced), and provides wireless communication with a terminal located in a sector corresponding to the RRH 1260 via the RRH 1260 and the antenna 1240. The wireless communication interface 1255 may typically include, for example, a BB processor 1256. Other than connecting to an RF circuit 1264 of the RRH 1260 via the connection interface 1257, the BB processor 1256 is the same as the BB processor 1126 described with reference to FIG. 11. As show in FIG. 12, the wireless communication interface 1255 may include multiple BB processors 1256. For example, the multiple BB processors 1256 may be compatible with the multiple frequency bands used by the eNB 1230. Although FIG. 12 illustrates an example in which the wireless communication interface 1255 includes multiple BB processors 1256, the wireless communication interface 1255 may also include a single BB processor 1256.

The connection interface 1257 is an interface for connecting the base station device 1250 (the wireless communication interface 1255) to the RRH 1260. The connection interface 1257 may also be a communication module for communication in the above-described high-speed line that connects the base station device 1250 (the wireless communication interface 1255) to the RRH 1260.

The RRH 1260 includes a connection interface 1261 and a wireless communication interface 1263.

The connection interface 1261 is an interface for connecting the RRH 1260 (the wireless communication interface 1263) to the base station device 1250. The connection interface 1261 may also be a communication module for the communication in the above high-speed line.

The wireless communication interface 1263 transmits and receives a radio signal via the antenna 1240. The wireless communication interface 1263 may generally include, for example, the RF circuit 1264. The RF circuit 1264 may include, for example, a frequency mixer, a filter and an amplifier, and transmit and receive a radio signal via the antenna 1240. The wireless communication interface 1263 may include multiple RF circuits 1264, as shown in FIG. 12. For example, the multiple RF circuits 1264 may support multiple antenna elements. Although FIG. 12 illustrates the example in which the wireless communication interface 1263 includes the multiple RF circuits 1264, the wireless communication interface 1263 may also include a single RF circuit 1264.

In the eNB 1100 shown in FIG. 11 and the eNB 1230 shown in FIG. 12, the communication unit in the above-described electronic apparatus 100 may be implemented by the wireless communication interface 1125 and the wireless communication interface 1255 and/or the wireless communication interface 1263. At least part of the functions of the determining unit 102 and the adjusting unit 104 in the electronic apparatus 100 may also be realized by the controller 1121 and the controller 1251.

(9-2. Application Examples of User Equipment)

First Application Example

Figure 13:
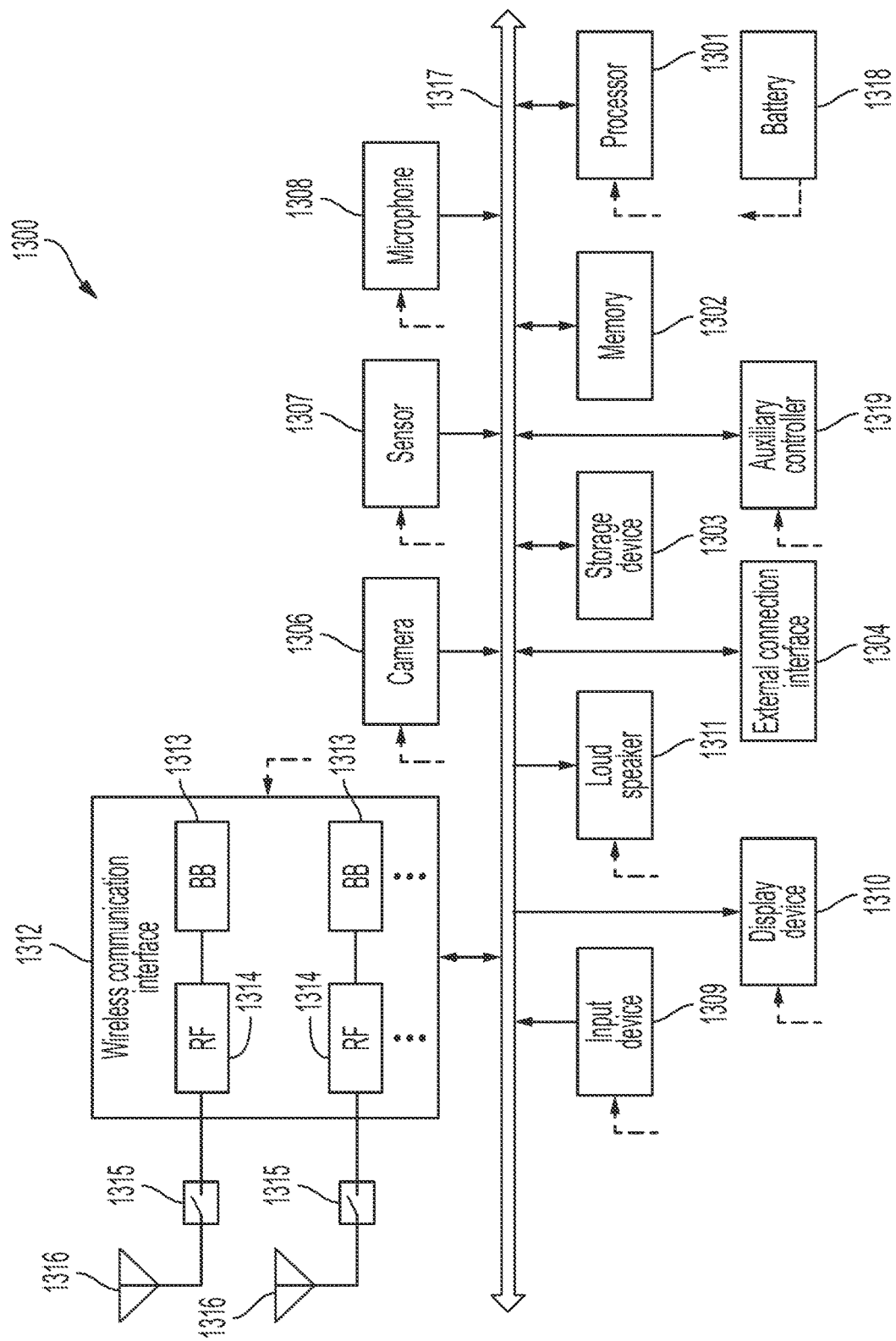
FIG. 13 is a block diagram showing an example of a schematic configuration of a smartphone to which the technology of the present disclosure may be applied.

FIG. 13 is a block diagram showing an example of exemplary configuration of a smartphone 1300 to which the technology of the present disclosure may be applied. The smart phone 1300 includes a processor 1301, a memory 1302, a storage device 1303, an external connection interface 1304, a camera 1306, a sensor 1307, a microphone 1308, an input device 1309, a display device 1310, a speaker 1311, a wireless communication interface 1312, one or more antenna switches 1315, one or more antennas 1316, a bus 1317, a battery 1318 and an auxiliary controller 1319.

The processor 1301 may be, for example, a CPU or a system on chip (SoC), and control functions of an application layer and other layers of the smart phone 1300. The memory 1302 includes a RAM and a ROM, and stores a program that is executed by the processor 1301, and data. The storage device 1303 may include a storage medium such as a semiconductor memory and a hard disk. The external connection interface 1304 is an interface for connecting an external device (such as a memory card and a universal serial bus (USB) device) to the smart phone 1300.

The camera 1306 includes an image sensor such as a charge coupled device (CCD) and a complementary metal oxide semiconductor (CMOS), and generates a captured image. The sensor 1307 may include a group of sensors such as a measurement sensor, a gyro sensor, a geomagnetic sensor, and an acceleration sensor. The microphone 1308 converts sounds that are inputted to the smart phone 1300 into audio signals. The input device 1309 includes, for example, a touch sensor configured to detect touch onto a screen of the display device 1310, a keypad, a keyboard, a button, or a switch, and receive an operation or information inputted from a user. The display device 1310 includes a screen such as a liquid crystal display (LCD) and an organic light-emitting diode (OLED) display, and displays an output image of the smart phone 1300. The speaker 1311 converts audio signals that are outputted from the smartphone 1300 to sounds.

The wireless communication interface 1312 supports any cellular communication scheme (such as LTE and LTE-Advanced), and performs wireless communication. The wireless communication interface 1312 may typically include, for example, a base band (BB) processor 1313 and a RF circuit 1314. The BB processor 1313 may perform encoding/decoding, modulating/demodulating and multiplexing/demultiplexing, for example, and perform various types of signal processing for wireless communication. The RF circuit 1314 may include a frequency mixer, a filter and an amplifier, for example, and transmit and receive a radio signal via the antenna 1316. The wireless communication interface 1312 may be a chip module having the BB processor 1313 and the RF circuit 1314 integrated thereon. The wireless communication interface 1312 may include multiple BB processors 1313 and multiple RF circuits 1314, as shown in FIG. 13. Although FIG. 13 illustrates the example in which the wireless communication interface 1312 includes the multiple BB processors 1313 and the multiple RF circuits 1314, the wireless communication interface 1312 may also include a single BB processor 1313 or a single RF circuit 1314.

Moreover, in addition to a cellular communication scheme, the wireless communication interface 1312 may also support a wireless communication scheme of another type, such as a device to device (D2D) communication scheme, a short-distance wireless communication scheme, a near field communication scheme, and a wireless local area network (LAN) scheme. In this case, the wireless communication interface 1312 may include a BB processor 1313 and an RF circuit 1314 for each wireless communication scheme.

Each of the antenna switches 1315 switches connection destinations of the antennas 1316 among multiple circuits (such as circuits for different wireless communication schemes) included in the wireless communication interface 1312.

Each of the antennas 1316 includes one or more antenna elements (such as multiple antenna elements included in an MIMO antenna), and is used for the wireless communication interface 1312 to transmit and receive radio signals. The smartphone 1300 may include the multiple antennas 1316, as shown in FIG. 13. Although FIG. 13 illustrates the example in which the smartphone 1300 includes the multiple antennas 1316, the smartphone 1300 may also include a single antenna 1316.

In addition, the smart phone 1300 may include an antenna 1316 for each wireless communication scheme. In this case, the antenna switches 1315 may be omitted from the configuration of the smart phone 1300.

The bus 1317 connects the processor 1301, the memory 1302, the storage device 1303, the external connection interface 1304, the camera 1306, the sensor 1307, the microphone 1308, the input device 1309, the display device 1310, the speaker 1311, the wireless communication interface 1312, and the auxiliary controller 1319 to each other. The battery 1318 supplies power to each block of the smartphone 1300 shown in FIG. 13 via feeders which are partially shown by dashed lines in the figure. The auxiliary controller 1319 operates a minimum necessary function of the smartphone 1300, for example, in a sleep mode.

In the smartphone 1300 shown in FIG. 13, the communication unit in the electronic apparatus 200 described above may be implemented by the wireless communication interface 1312. At least a part of the functions of the parameter information generating unit 202, the flag generating unit 204 and the synchronization unit 206 may also be implemented by the processor 1301 or the auxiliary controller 1319.

Second Application Example

Figure 14:
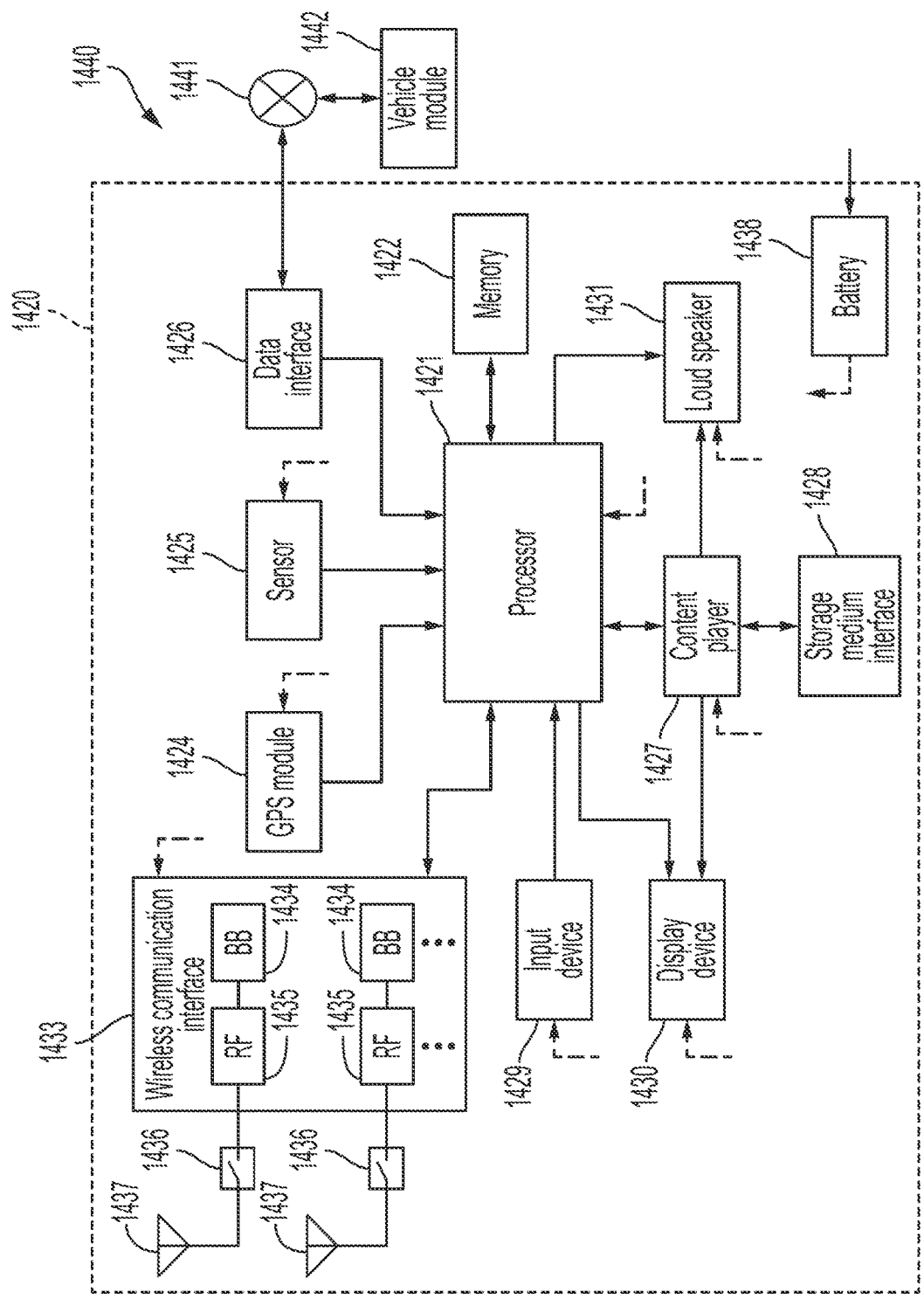
FIG. 14 is a block diagram of an example of a schematic configuration of a car navigation device to which the technology of the present disclosure may be applied.

FIG. 14 is a block diagram showing an example of a schematic configuration of a car navigation device 1420 to which the technology according to the present disclosure may be applied. The car navigation device 1420 includes a processor 1421, a memory 1422, a global positioning system (GPS) module 1424, a sensor 1425, a data interface 1426, a content player 1427, a storage medium interface 1428, an input device 1429, a display device 1430, a speaker 1431, a wireless communication interface 1433, one or more antenna switches 1436, one or more antennas 1437, and a battery 1438.

The processor 1421 may be for example the CPU or the SoC, and control the navigation function and other functions of the car navigation device 1420. The memory 1422 includes a RAM and a ROM, and stores a program that is executed by the processor 1421 and data.

The GPS module 1424 determines a position (such as latitude, longitude, and altitude) of the car navigation device 1420 by using GPS signals received from a GPS satellite. The sensor 1425 may include a group of sensors such as a gyroscope sensor, a geomagnetic sensor and an air pressure sensor. The data interface 1426 is connected to, for example, an in-vehicle network 1441 via a terminal that is not shown, and acquires data generated by the vehicle, such as vehicle speed data.

The content player 1427 reproduces content stored in a storage medium (such as a CD and a DVD) that is inserted into the storage medium interface 1428. The input device 1429 includes, for example, a touch sensor configured to detect touch on a screen of the display device 1430, a button, or a switch, and receives an operation or information inputted from a user. The display device 1430 includes a screen such as a LCD or an OLED display, and displays an image of the navigation function or content that is reproduced. The speaker 1431 outputs sounds of the navigation function or the content that is reproduced.

The wireless communication interface 1433 supports any cellular communication scheme (such as LTE and LTE-advanced) and performs wireless communication. The wireless communication interface 1433 may typically include, for example, a BB processor 1434 and an RF circuit 1435. The BB processor 1434 may perform encoding/decoding, modulating/demodulating and multiplexing/demultiplexing, for example, and perform various types of signal processing for wireless communication. The RF circuit 1435 may include a mixer, a filter and an amplifier, for example, and transmit and receive a radio signal via the antenna 1437. The wireless communication interface 1433 may also be one chip module that has the BB processor 1434 and the RF circuit 1435 integrated thereon. The wireless communication interface 1433 may include multiple BB processors 1434 and multiple RF circuits 1435, as shown in FIG. 14. Although FIG. 14 shows the example in which the wireless communication interface 1433 includes the multiple BB processors 1434 and the multiple RF circuits 1435, the wireless communication interface 1433 may also include a single BB processor 1434 or a single RF circuit 1435.

In addition to the cellular communication scheme, the wireless communication interface 1433 may also support a wireless communication scheme of another type, such as a device-to-device (D2D) communication scheme, a short-distance wireless communication scheme, a near field communication scheme, and a wireless LAN scheme. In this case, the wireless communication interface 1433 may include a BB processor 1434 and a RF circuit 1435 for each wireless communication scheme.

Each of the antenna switches 1436 switches connection destinations of the antenna 1437 among multiple circuits (such as circuits for different wireless communication schemes) included in the wireless communication interface 1433.

Each of the antennas 1437 includes one or more antenna elements (such as multiple antenna elements included in the MIMO antenna), and is used for the wireless communication interface 1433 to transmit and receive a radio signal. The car navigation device 1420 may include multiple antennas 1437, as shown in FIG. 14. Although FIG. 14 illustrates the example in which the car navigation device 1420 includes the multiple antennas 1437, the car navigation device 1420 may also include a single antenna 1437.

Furthermore, the car navigation device 1420 may include the antenna 1437 for each wireless communication scheme. In that case, the antenna switches 1436 may be omitted from the configuration of the car navigation device 1420.

The battery 1438 supplies power to each block of the car navigation device 1420 shown in FIG. 14 via feeders which are partially shown by dashed lines in the figure. The battery 1438 accumulates power supplied form the vehicle.

In the car navigation device 1420 shown in FIG. 14, the communication unit in the electronic apparatus 200 described above may be implemented by the wireless communication interface 1433. At least a part of the functions of the parameter information generating unit 202, the flag generating unit 204 and the synchronization unit 206 may also be implemented by the processor 1421.

The technology of the present disclosure may also be implemented as an in-vehicle system (or a vehicle) 1440 including one or more of the blocks of the car navigation device 1420, an in-vehicle network 1441 and a vehicle module 1442. The vehicle module 1442 generates vehicle data such as vehicle speed, engine speed, and fault information, and outputs the generated data to the in-vehicle network 1441.

Preferred embodiments of the disclosure have been described above with reference to the drawings, but the disclosure is not limited to the above examples of course. Those skilled in the art may make various changes and modifications within the scope of the appended claims, and it is to be understood that such changes and modifications naturally fall within the technical scope of the present disclosure.

For example, multiple functions of one unit in the above embodiment may be realized by separate devices. Alternatively, multiple functions implemented by multiple units in the above embodiments may be respectively implemented by separate devices. Furthermore, one of the above functions may be implemented by multiple units. Needless to say, such configurations are included in the technical scope of the present disclosure.

In the specification, steps described in the flowchart include not only the processing performed chronologically, but also the processing performed in parallel or individually rather than chronologically. Further, even in the steps processed chronically, without saying, the order may be appropriately changed.

Although the present disclosure and its advantages have been described in detail, it is to be understood that various changes, substitutions and alterations may be made without departing from the spirit and scope of the disclosure as defined by the appended claims. Moreover, the term "include", "comprise" or any variant thereof in the embodiments of the present disclosure is intended to encompass nonexclusive inclusion, so that a process, a method, an article or a device including a series of elements includes not only those elements but also other elements that are not expressively listed or an element) inherent to the process, the method, the article or the device. The elements defined by the statement "comprising one . . . " do not exclude that there are other identical elements in the process, method, article, or device that includes the elements, if not specifically limited otherwise.

The invention claimed is:

1. An electronic apparatus in a wireless communication system, the electronic apparatus comprising processing circuitry configured to:
   determine, according to information regarding one or more groups of performance parameters from a user equipment, one or more reporting periods for the user equipment to report an asynchronization flag, which are to be notified to the user equipment, wherein the asynchronization flag indicates whether a synchronization time delay between the user equipment and a base station exceeds a predetermined system tolerance; and
   adjust, if the asynchronization flag reported by the user equipment at one of the one or more reporting periods indicates the synchronization time delay exceeds the predetermined system tolerance, a timing advance, so that the user equipment makes synchronization with the base station according to the adjusted timing advance,
   wherein the processing circuitry is further configured to determine a predetermined displacement threshold according to the predetermined system tolerance, the predetermined displacement threshold being to be notified to the user equipment so that the user equipment generates the asynchronization flag according to the predetermined displacement threshold and a relative displacement of the user equipment within one of the one or more reporting periods, or determine a predetermined number threshold according to a predetermined power control step and the predetermined system tolerance, the predetermined number threshold being to be notified to the user equipment so that the user equipment generates the asynchronization flag according to the predetermined number threshold and a number of times that a transmission power of the user equipment is relatively increased or decreased within one of the one or more reporting periods.

2. The electronic apparatus according to claim 1, wherein the processing circuitry is further configured to determine each of the one or more reporting periods, so that the synchronization time delay generated when the user equipment moves at a maximum speed within the reporting period is within the predetermined system tolerance.

3. The electronic apparatus according to claim 2, wherein the processing circuitry is further configured to set, in a case that information regarding one group of the one or more groups of performance parameters indicates a synchronization requirement between the user equipment and the base station is higher than a predetermined standard, a reporting period corresponding to the one group of performance parameters to be equal to or smaller than a length of a time alignment timer.

4. The electronic apparatus according to claim 1, wherein the processing circuitry is further configured to calculate a current synchronization time delay of the user equipment and adjust the timing advance according to the current synchronization time delay, if the asynchronization flag indicates that the synchronization time delay between the user equipment and the base station exceeds the predetermined system tolerance, wherein the one or more groups of performance parameters comprise only one group of performance parameters currently used by the user equipment or all groups of performance parameters supported by the user equipment, or wherein the electronic apparatus operates as the base station and further comprises a communication unit configured to perform data transmission and reception operations.

5. The electronic apparatus according to claim 1, wherein each group of the one or more groups of performance parameters comprise one or more of a waveform type, a cyclic prefix length, a filter length and a subcarrier interval.

6. The electronic apparatus according to claim 5, wherein the waveform type comprises Flexible Cyclic Prefix-Orthogonal Frequency Division Multiplexing (FCP-OFDM), Filtered Orthogonal Frequency Division Multiplexing (F-OFDM), Filter Bank Multi-carrier (FBMC), Generalized Frequency Division Multiplexing (GFDM), Universal Filtered Multi-Carrier (UFMC), Cyclic Prefix-Orthogonal Frequency Division Multiplexing (CP-OFDM) and Discrete Fourier transform-Spread-Orthogonal Frequency Division Multiplexing (DFT-S-OFDM).

7. The electronic apparatus according to claim 1, wherein the electronic apparatus further comprises a memory in which a table representing all available groups of performance parameters in the wireless communication system is stored, the information regarding the one or more groups of performance parameters is one or more indexes indicating the one or more groups of performance parameters, and the processing circuitry is further configured to determine, according to the received one or more indexes, the one or more reporting periods by referring to the table.

8. An electronic apparatus in a wireless communication system, the electronic apparatus comprising processing circuitry configured to:

generate information regarding one or more groups of performance parameters of a user equipment, the information being to be reported to a base station;

generate, based on one or more reporting periods for reporting an asynchronization flag from the base station and one group of performance parameters currently used by the user equipment, the asynchronization flag, which is to be reported to the base station, wherein the asynchronization flag indicates whether a synchronization time delay between the user equipment and the base station exceeds a predetermined system tolerance; and make synchronization with the base station according to a timing advance, which is determined by the base station based on the asynchronization flag, wherein the processing circuitry is further configured to determine a predetermined displacement threshold according to the predetermined system tolerance, the predetermined displacement threshold being to be notified to the user equipment so that the user equipment generates the asynchronization flag according to the predetermined displacement threshold and a relative displacement of the user equipment within one of the one or more reporting periods, or determine a predetermined number threshold according to a predetermined power control step and the predetermined system tolerance, the predetermined number threshold being to be notified to the user equipment so that the user equipment generates the asynchronization flag according to the predetermined number threshold and a number of times that a transmission power of the user equipment is relatively increased or decreased within one of the one or more reporting periods.

9. The electronic apparatus according to claim 8, wherein the processing circuitry is further configured to generate the asynchronization flag according to a relative displacement of the user equipment within a reporting period corresponding to the one group of performance parameters currently used by the user equipment.

10. The electronic apparatus according to claim 9, wherein the processing circuitry is further configured to generate, if the relative displacement is larger than or equal to a predetermined displacement threshold, the asynchronization flag which indicates the synchronization time delay between the user equipment and the base station exceeds the predetermined system tolerance.

11. The electronic apparatus according to claim 10, wherein the predetermined displacement threshold is from the base station.

12. The electronic apparatus according to claim 9, wherein the processing circuitry is further configured to estimate the relative displacement by monitoring a variation in power control signaling and/or a variation in path loss within the reporting period corresponding to the one group of performance parameters currently used by the user equipment.

13. The electronic apparatus according to claim 12, wherein the processing circuitry is further configured to generate, in a case that it is monitored that the variation in the power control signaling and/or the variation in the path loss indicates that a number of times that a transmission power of the user equipment is relatively increased or decreased within the reporting period corresponding to the one group of performance parameters currently used by the user equipment is larger than or equal to a predetermined number threshold, the asynchronization flag which indicates the synchronization time delay between the user equipment and the base station exceeds the predetermined system tolerance.

14. The electronic apparatus according to claim 13, wherein the predetermined number threshold is from the base station, or the processing circuitry is further configured to determine the predetermined number threshold according to a predetermined power control step and the predetermined system tolerance.

15. The electronic apparatus according to claim 8, wherein the one or more groups of performance parameters comprise only one group of performance parameters currently used by the user equipment or all groups of performance parameters supported by the user equipment.

16. The electronic apparatus according to claim 15, wherein in a case that the one or more groups of performance parameters comprise only one group of performance parameters currently used by the user equipment, the processing circuitry is further configured to:
generate, when the user equipment switches a waveform, information regarding one group of performance parameters of the switched waveform, the information being to be reported to the base station for the base station to determine a reporting period corresponding to the one group of performance parameters of the switched waveform.

17. The electronic apparatus according to claim 8, wherein each group of the one or more groups of performance parameters comprise one or more of a waveform type, a cyclic prefix length, a filter length and a subcarrier interval, or
wherein the electronic apparatus further comprises a memory in which a table representing all available groups of performance parameters in the wireless communication system is stored, and the processing circuitry is further configured to generate, by referring to the table, one or more indexes indicating the one or more groups of performance parameters as the information regarding the one or more groups of performance parameters.

18. The electronic apparatus according to claim 8, wherein the electronic apparatus operates as the user equipment and further comprises:
a communication unit configured to perform data transmission and reception operations.

19. A method in a wireless communication system, the method comprising:
generating information regarding one or more groups of performance parameters of a user equipment, the information being to be reported to a base station;
generating, based on one or more reporting periods for reporting an asynchronization flag from the base station and one group of performance parameters currently used by the user equipment, the asynchronization flag, which is to be reported to the base station, wherein the asynchronization flag indicates whether a synchronization time delay between the user equipment and the base station exceeds a predetermined system tolerance;
making synchronization with the base station according to a timing advance, which is determined by the base station based on the synchronization flag; and
determining a predetermined displacement threshold according to the predetermined system tolerance, the predetermined displacement threshold being to be notified to the user equipment so that the user equipment generates the asynchronization flag according to the predetermined displacement threshold and a relative displacement of the user equipment within one of the one or more reporting periods, or
determining a predetermined number threshold according to a predetermined power control step and the predetermined system tolerance, the predetermined number threshold being to be notified to the user equipment so that the user equipment generates the asynchronization flag according to the predetermined number threshold and a number of times that a transmission power of the user equipment is relatively increased or decreased within one of the one or more reporting periods.

\* \* \* \* \*